United States Patent
Fu

(10) Patent No.: US 9,806,637 B2
(45) Date of Patent: Oct. 31, 2017

(54) SOFT SWITCHING INVERTER DEVICE AND METHOD

(71) Applicant: FutureWei Technologies, Inc., Plano, TX (US)

(72) Inventor: Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1109 days.

(21) Appl. No.: 13/874,303

(22) Filed: Apr. 30, 2013

(65) Prior Publication Data

US 2014/0319919 A1 Oct. 30, 2014

(51) Int. Cl.
*H02M 7/539* (2006.01)
*H02M 7/487* (2007.01)
*H02M 7/538* (2007.01)
*H02M 1/00* (2006.01)

(52) U.S. Cl.
CPC ........... *H02M 7/539* (2013.01); *H02M 7/487* (2013.01); *H02M 7/538* (2013.01); *H02M 2001/0058* (2013.01); *Y02B 70/1491* (2013.01); *Y10T 307/50* (2015.04); *Y10T 307/707* (2015.04); *Y10T 307/747* (2015.04)

(58) Field of Classification Search
CPC ...... H02M 7/483; H02M 7/487; H02M 7/538; H02M 7/539; H02M 2001/0058; H02M 2001/0054
USPC .................................. 307/82, 43, 113, 131
See application file for complete search history.

(56) References Cited

U.S. PATENT DOCUMENTS

2010/0315152 A1* 12/2010 Zhang ................... H02M 3/158
327/434

* cited by examiner

*Primary Examiner* — Rexford Barnie
*Assistant Examiner* — Thai Tran
(74) *Attorney, Agent, or Firm* — Slater Matsil, LLP

(57) ABSTRACT

An inverter comprises a first switch coupled to an input of an output filter and a positive dc bus, a second switch coupled to the input of the output filter and a negative dc bus, a first freewheeling apparatus coupled to the first switch, the second switch and ground, a first soft switching network coupled to the first freewheeling apparatus and the first switch, wherein the first soft switching network is configured such that the first switch is of a first zero voltage transition during a turn-on process of the first switch and a second soft switching network coupled to the first freewheeling apparatus and the second switch, wherein the second soft switching network is configured such that the second switch is of a second zero voltage transition during a turn-on process of the second switch.

10 Claims, 28 Drawing Sheets

SOFT SWITCHING INVERTER DEVICE AND METHOD

TECHNICAL FIELD

The present invention relates to an inverter device and method, and, in particular embodiments, to a soft switching inverter and method for solar applications.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In solar applications, three-level inverters and five-level inverters are widely employed to achieve high efficiency and low total harmonic distortion. Such three-level inverters and five-level inverters are alternatively referred to as multilevel inverters.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

The diode clamped multilevel inverter is commonly referred to as a three-level neutral point clamped (NCP) inverter. A three-level NCP inverter requires two series connected capacitors coupled between the input dc buses. Each capacitor is charged to an equal potential. Furthermore, the three-level NCP inverter may comprise four switching elements and two clamping diodes. The clamping diodes help to reduce the voltage stress on the switching element to one capacitor voltage level.

An NCP inverter utilizes a staircase waveform to generate an ac output. Such a staircase waveform resembles a desired sinusoidal waveform. As a result, the output voltage of the NCP inverter may be of a low total harmonic distortion (THD). In addition, the staircase waveform may reduce the voltage stresses. As a result, the electromagnetic compatibility (EMC) performance of the NCP inverter may be improved. In addition, to achieve the same THD, the NCP inverter may operate at a lower switching frequency. Such a lower switching helps to reduce switching losses so as to achieve an efficient power conversion system.

SUMMARY OF THE INVENTION

These and other problems are generally solved or circumvented, and technical advantages are generally achieved, by preferred embodiments of the present invention which provide an apparatus of soft switching inverters in solar applications.

In accordance with an embodiment, an inverter comprises a first switch coupled to an input of an output filter and a positive dc bus, a second switch coupled to the input of the output filter and a negative dc bus, two input capacitors connected in series and further coupled between the positive dc bus and the negative dc bus, a first freewheeling apparatus coupled to the first switch, the second switch and ground, a first soft switching network coupled to the first freewheeling apparatus and the first switch, wherein the first soft switching network is configured such that the first switch is of a first zero voltage transition during a turn-on process of the first switch and a second soft switching network coupled to the first freewheeling apparatus and the second switch, wherein the second soft switching network is configured such that the second switch is of a second zero voltage transition during a turn-on process of the second switch.

In accordance with another embodiment, an apparatus comprises a soft switching network coupled to a power converter comprising a main switch, a freewheeling apparatus and an output filter, wherein the soft switching network comprises a magnetic device, an auxiliary switch and a plurality of diodes, and wherein the soft switching network is configured such that the main switch is of zero voltage switching and the auxiliary switch is of zero current switching.

In accordance with yet another embodiment, a three-phase system comprises a first-phase multilevel inverter, a second-phase multilevel inverter and a third-phase multilevel inverter.

Each multilevel inverter comprises a first switch coupled to an input of an output filter and a positive dc bus, a second switch coupled to the input of the output filter and a negative dc bus, two input capacitors connected in series and further coupled between the positive dc bus and the negative dc bus, a first freewheeling apparatus coupled to the first switch, the second switch and ground, a first soft switching network coupled to the first freewheeling apparatus and the first switch, wherein the first soft switching network is configured such that the first switch is of a first zero voltage transition during a turn-on process of the first switch and a second soft switching network coupled to the first freewheeling apparatus and the second switch, wherein the second soft switching network is configured such that the second switch is of a second zero voltage transition during a turn-on process of the second switch.

In accordance with yet another embodiment, a method comprises providing a soft switching network coupled to a main switch, a freewheeling apparatus and an output filter of a power converter, wherein the soft switching network comprises a magnetic device, an auxiliary switch connected in series with the magnetic device and a plurality of diodes coupled to the magnetic device.

The method further comprises, prior to a zero voltage transition of the main switch, turning on the auxiliary switch and after the zero voltage transition turning off the auxiliary switch.

An advantage of an embodiment of the present invention is that a soft switching network helps to achieve zero voltage switching for the main switch of the inverter and zero current switching for the switching elements in the soft switching network. Such zero voltage switching and zero current switching help to reduce the voltage stresses of a solar inverter. As a result, the soft switching network helps to improve the efficiency, reliability and cost of the solar inverter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a soft switching inverter system. The invention may also be applied, however, to a variety of power converters including multilevel inverters, step-up converters, step-down converters and the like. Furthermore, the invention may also be applied to a variety of three-phase inverters. Hereinafter, various embodiments will be explained in detail with reference to the accompanying drawings.

Figure 1:
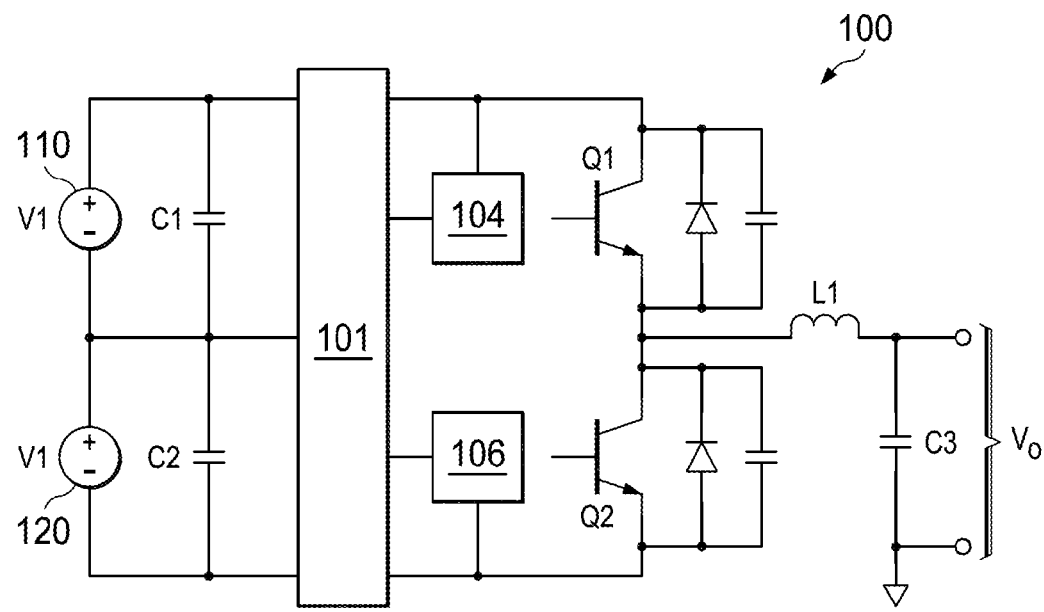
FIG. 1 illustrates a block diagram of a soft switching inverter system in accordance with various embodiments of the present disclosure.

FIG. 1 illustrates a block diagram of a soft switching inverter system in accordance with various embodiments of the present disclosure. The soft switching inverter system 100 comprises a first input dc source 110 having an output voltage V1, a second input dc source 120 having an output voltage −V1 and a freewheeling apparatus 101. There may be an input capacitor (e.g., capacitors C1 and C2) connected in parallel with each input dc source.

As shown in FIG. 1, input capacitors C1 and C2 are connected in series. Input capacitors C1 and C2 are connected in parallel with the first input dc source 110 and the second input dc source 120 respectively. In some embodiments, the common node of the input capacitors C1 and C2 is connected to ground.

The soft switching inverter system 100 may further comprise an output filter formed by an inductor L1 and a capacitor C3, and a plurality of switches Q1 and Q2. As shown in FIG. 1, the input of the output filter is coupled to the common node of the switches Q1 and Q2. In some embodiments, the switches Q1 and Q2 may be coupled to the positive input bus and the negative input bus respectively. In alternative embodiments, the switches Q1 and Q2 may be coupled to the positive input bus and the negative input bus respectively through a first boost apparatus and a second boost apparatus (not shown respectively).

In accordance with an embodiment, the switches (e.g., switch Q1) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

Each switch is configured such that a staircase waveform is generated at the input of the filter by using different combinations of the switches. In some embodiments, the staircase waveform may be a three-level waveform. In particular, when the switch Q1 is turned on and the switch Q2 is turned off, the output voltage Vo is coupled to the output of the first input dc source 110 (a.k.a. the positive input bus). As a result, the output voltage Vo has a voltage potential of V1.

Likewise, when the switch Q1 is turned off and the switch Q2 is turned on, the output voltage Vo is coupled to the output of the second input dc source 120 (a.k.a. the negative input bus). As a result, the output voltage Vo has a voltage potential of −V1. Furthermore, when both switches Q1 and Q2 are turned off, the output voltage Vo is coupled to the common node of the first input dc voltage source 110 and the second input dc source 120 through the freewheeling apparatus 101.

It should be noted that the three-level inverter described above is merely an example. A person skilled in the art will recognize that there may be many variations, modifications and alternatives. For example, two boost apparatuses (not shown) may be coupled to the first input dc source 110 and the second input dc source 120 respectively. As a result, there may be five voltage levels available for the soft switching inverter system 100. Depending on different applications and design needs, a variety of soft switching inverter systems may be formed accordingly.

It should further be noted that while the example above includes two boost apparatuses, the soft switching inverter system 100 could accommodate any number of boost apparatuses. The number of boost apparatuses described above is limited solely for the purpose of clearly illustrating the inventive aspects of the various embodiments. The present disclosure is not limited to any specific number of boost apparatuses. One of ordinary skill in the art would recognize many variations, alternatives, and modifications. For example, additional boost apparatuses may be employed to achieve an output staircase waveform having additional voltage levels.

FIG. 1 further illustrates a first soft switching network 104 and a second soft switching network 106. As shown in FIG. 1, the first soft switching network 104 is coupled to the freewheeling apparatus 101 as well as the switch Q1. The second soft switching network 106 is coupled to the freewheeling apparatus 101 as well as the switch Q2. The soft switching networks 104 and 106 may function as a zero voltage switching unit. Such a zero voltage switching unit helps to achieve a zero voltage transition across the switches (e.g., switch Q1). Furthermore, the main switching element of the soft switching networks 104 and 106 may operate at a soft switching mode such as a zero current transition during a turn-off process. As such, the power losses of the switches Q1 and Q2 as well as the inverter system may be reduced accordingly. The detailed operation of the soft switching networks 104 and 106 will be described below with respect to FIGS. 3-10.

Figure 2:
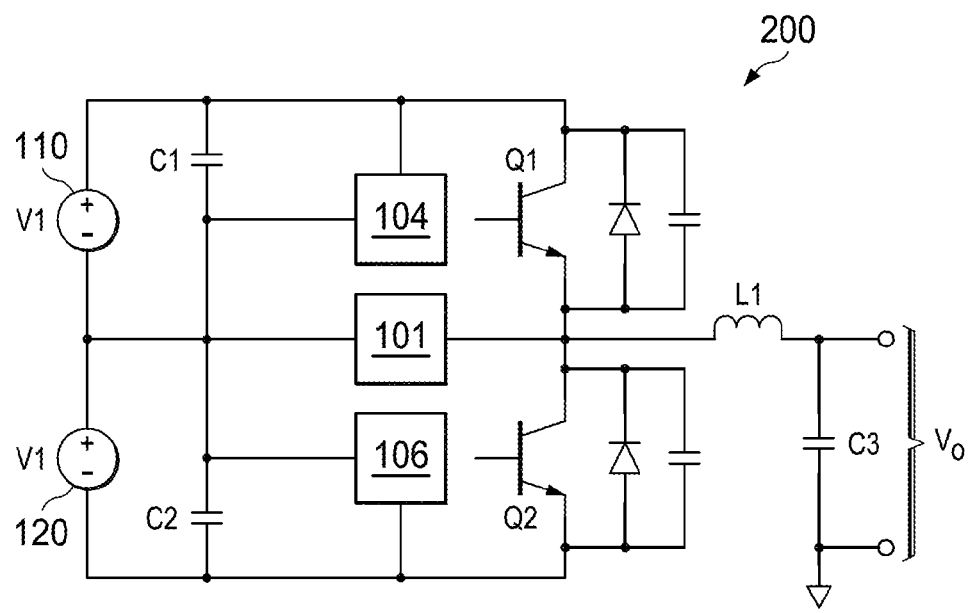
FIG. 2 illustrates a block diagram of an illustrative embodiment of the soft switching inverter system shown in FIG. 1 in accordance with various embodiments of the present disclosure.

FIG. 2 illustrates a block diagram of an illustrative embodiment of the soft switching inverter system shown in FIG. 1 in accordance with various embodiments of the present disclosure. The soft switching inverter system 200 is similar to the soft switching inverter system 100 shown in FIG. 1 except that the configuration of switches Q1, Q2 and the freewheeling apparatus 101 is slightly different. In particular, the switch Q1 is coupled between the output of the first input dc source 110 and the output filter. The switch Q2 is coupled between the output of the second input dc source 120 and the output filter. The freewheeling apparatus 101 is coupled between the input of the output filter and the common node of the input dc sources 110 and 120.

The soft switching inverter system 200 may further comprise the first soft switching network 104 and the second soft switching network 106. The soft switching networks 104 and 106 are employed to achieve a zero voltage transition at switches Q1 and Q2 respectively. Furthermore, the auxiliary switches of the soft switching networks 104 and 106 may be of a zero current transition in accordance with some embodiments. The detailed schematic and operation principles of the soft switching networks (e.g., the first soft switching network 104) will be described below with respect to FIGS. 3-10.

Figure 3:
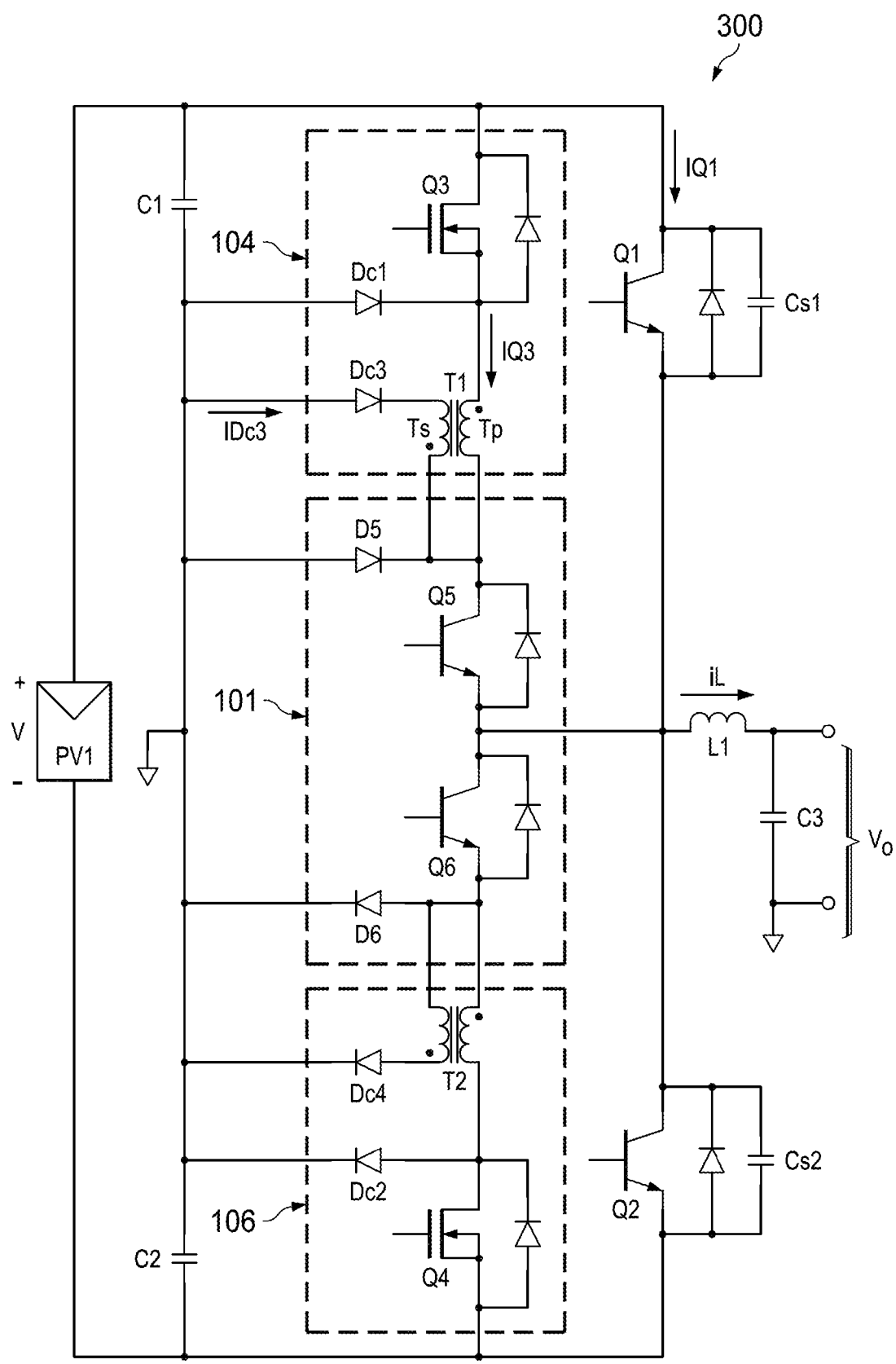
FIG. 3 illustrates a schematic diagram of a first illustrative embodiment of the soft switching inverter system shown in FIG. 2 in accordance with various embodiments of the present disclosure.

FIG. 3 illustrates a schematic diagram of a first illustrative embodiment of the soft switching inverter system shown in FIG. 2 in accordance with various embodiments of the present disclosure. The input dc sources 110 and 120 shown in FIG. 2 may be implemented as a solar panel. More particularly, in some embodiments, while FIG. 3 illustrate a single input dc source PV1, the input dc source PV1 may comprise a plurality of solar panels connected in series, in parallel, any combinations thereof and the like. Two input capacitors C1 and C2 are connected in series. The series-connected input capacitors are coupled to the output terminals of the input dc source PV1.

As shown in FIG. 3, the common node of capacitors C1 and C2 are connected to ground. As such, the input stage formed by capacitors C1 and C2 includes three voltage levels, namely V/2, 0 and −V/2 respectively.

The freewheeling apparatus 101 may comprise switches Q5 and Q6, and diodes D5 and D6. As shown in FIG. 3, the diode D5 and the switch Q5 may form a first freewheeling route connected between the input of the output filter and ground. In some embodiments, the first freewheeling route may provide a conductive path for the current flowing in the switch Q1 after Q1 is turned off.

Likewise, the diode D6 and the switch Q6 may form a second freewheeling route connected between the input of the output filter and ground. In some embodiments, the second freewheeling route may provide a conductive path for the current flowing in the switch Q2 after Q2 is turned off.

It should be noted that the schematic diagram of the freewheeling apparatus 101 described above is merely an exemplary structure and is not meant to limit the current embodiments. One of ordinary skill in the art would recognize many variations, alternatives, and modifications. For example, the diodes D5 and D6 may be replaced by two switches respectively. In addition, while FIG. 3 illustrates that switches Q5 and Q6 may be implemented as IGBT transistors, the switches Q5 and Q6 can be any controllable switches such as MOSFET devices, IGCT devices, GTO devices, SCR devices, JFET devices, MCT devices, any combinations thereof and/or the like.

As shown in FIG. 3, the first soft switching network 104 and the second soft switching network 106 may be of a same structure. For simplicity, only the structure and the operating principle of the first soft switching network 104 will be described in detail with respect to FIGS. 3-4.

As shown in FIG. 3, the first soft switching network 104 comprises a transformer T1, a first auxiliary switch Q3, a first auxiliary diode Dc1 and a second auxiliary diode Dc3. The dot notation of the transformer T1 marks the polarity of the transformer's windings. In other words, the dot notation indicates the primary side Tp and the secondary side Ts are out of phase by 180 degrees. The operation of a transformer is well known in the art, and hence is not discussed in further detail herein.

As shown in FIG. 3, the first auxiliary switch Q3 and the primary side Tp of the transformer T1 are connected in series and further coupled to the switch Q5 of the freewheeling apparatus 101. Likewise, the second auxiliary diode Dc3 and the secondary side Ts are connected in series to form a series connected network. Such a series connected network is connected in parallel with the diode D5. Furthermore, the first auxiliary diode Dc1 is coupled between ground and the common node of the first auxiliary switch Q3 and the primary side Tp of the transformer T1.

As shown in FIG. 3, the current flowing through the switch Q1 is referred to as IQ1. Likewise, the current flowing through the auxiliary switch Q3 is referred to as IQ3. The current flowing through the second auxiliary diode Dc3 is referred to as IDc3. In FIG. 3, the switch Q1 is implemented as an IGBT device and the auxiliary switch Q3 is implemented as a MOSFET device. As such, the voltage across the switch Q1 is referred to as $V_{CE\_Q1}$. The gate-to-emitter voltage of the switch Q1 is referred to as $V_{GE\_Q1}$. The gate-to-source voltage of the auxiliary switch Q3 is referred to as $V_{GS\_Q3}$. The current flowing through the inductor of the output filter is referred to as IL (a.k.a. load current).

Figure 5:
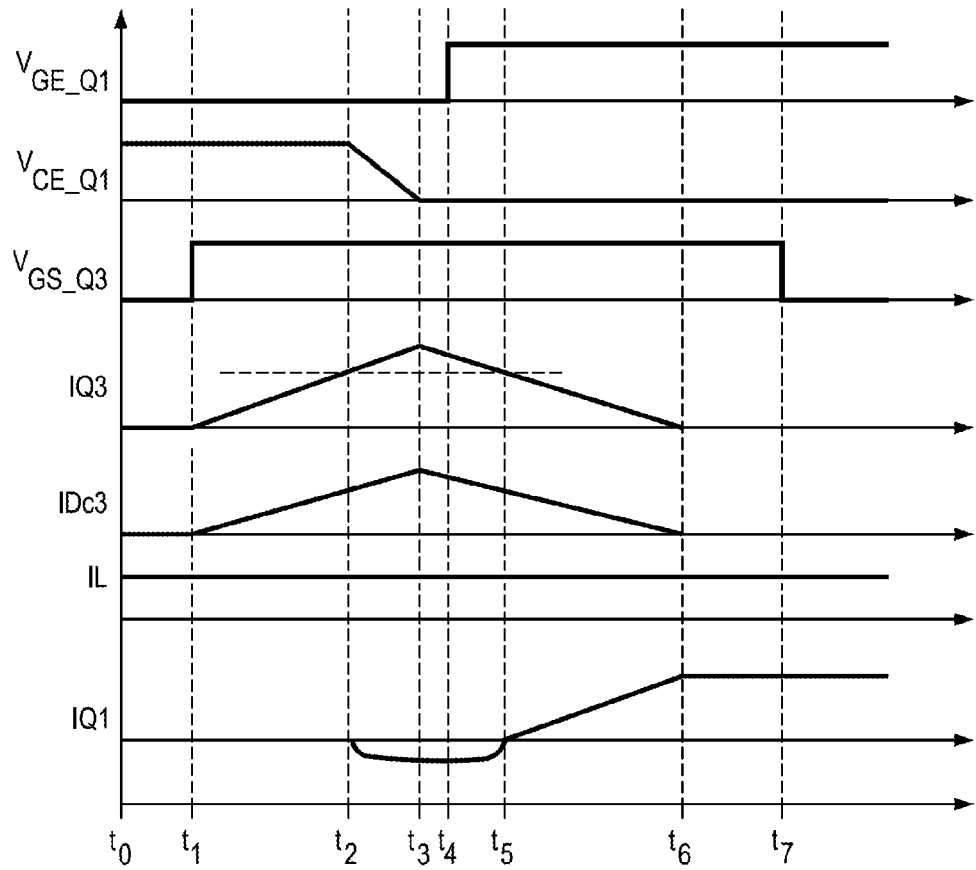
FIG. 5 illustrates a timing diagram of various signals in the soft switching inverter shown in FIG. 3 in accordance with various embodiments of the present disclosure.

FIG. 5 illustrates a timing diagram of various signals in the soft switching inverter system shown in FIG. 3 in accordance with various embodiments of the present disclosure. During the time interval from t0 to t1, switch Q1 is turned off. The auxiliary switch Q3 is turned off. At the time instant t1, the auxiliary switch Q3 is turned on in response to a voltage applied to the gate of the auxiliary switch Q3. The current flowing into the auxiliary switch Q3 may not change instantaneously since the auxiliary switch Q3 is connected in series with the primary side Tp of transformer T1. As shown in FIG. 5, the current IQ3 ramps up from zero to a peak value at the time instant t3. The ramp-up slope exhibits an approximately linear behavior as shown in FIG. 5.

During the time interval from t1 to t3, the current flowing through the second auxiliary diode Dc3 may ramp up in proportional to the increase of the current flowing through the auxiliary switch Q3 since currents IDc3 and IQ3 are the secondary current and the primary current of the transformer T1 respectively. At the time instant t2, the sum of currents IDc3 and IQ3 may be equal to the load current IL. As such, during the time interval from t2 to t3, IQ1 may be of a negative current to offset the increases of the currents IQ3 and IDc3 so that the load current IL is kept constant. Furthermore, as a consequence of such a negative current flowing through the switch Q1, the voltage $V_{CE\_Q1}$ across the switch Q1 may be discharged accordingly during the time interval from t2 to t3.

During the discharge process described above, the output capacitor of the switch Q1, the leakage inductance of the transformer T1 may form an L-C resonant process. Such an L-C resonant process may lead to a current decrease after the current IQ3 reaches its peak value at the time instant t3. Since the current IDc3 is a current flowing through the secondary side of the transformer T1, the current IDc3 drops in response to the decrease of the current IQ3 as shown in FIG. 5.

During the time internal from t3 to t4, the sum of the currents IQ3 and IDc3 is still greater than the load current IL. Therefore, the current IQ1 is still a negative current as shown in FIG. 5. At the time instant t4, the voltage VCE_Q1 is of a voltage level approximately equal to zero. The switch Q1 may be turned on at this time instant so that the switch Q1 may achieve zero voltage switching.

It should be noted that the time instant at which the switch Q1 is turned on shown in FIG. 5 is merely an example. The switch Q1 may be of a zero voltage transition if the switch Q1 is turned on at any time instant during a time interval from t3 to t5. At the time instant t5, the sum of the currents IQ3 and IDc3 is less than the load current IL. As a result, even if the switch Q1 is not turned on, the current IQ1 may change from a negative current to a positive current so as to maintain the load current IL constant. Such a positive current IQ1 may charge the output capacitor of the switch Q1. As a result, the voltage across the switch Q1 may increase. Therefore, a zero voltage turn-on of the switch Q1 may occur in a time interval from t3 to t5. After the current IQ1 changes from a negative current to a positive current, the switch Q1 may not achieve zero voltage switching.

After the switch Q1 is turned on, the primary side Tp (shown in FIG. 3) of the transformer T1 may be shorted by a conductive path formed by switches Q1, Q3 and Q5. In order to better analyze the behavior of the current IQ3 after the switch Q1 is turned on, an equivalent circuit is illustrated in FIG. 4.

Figure 4:
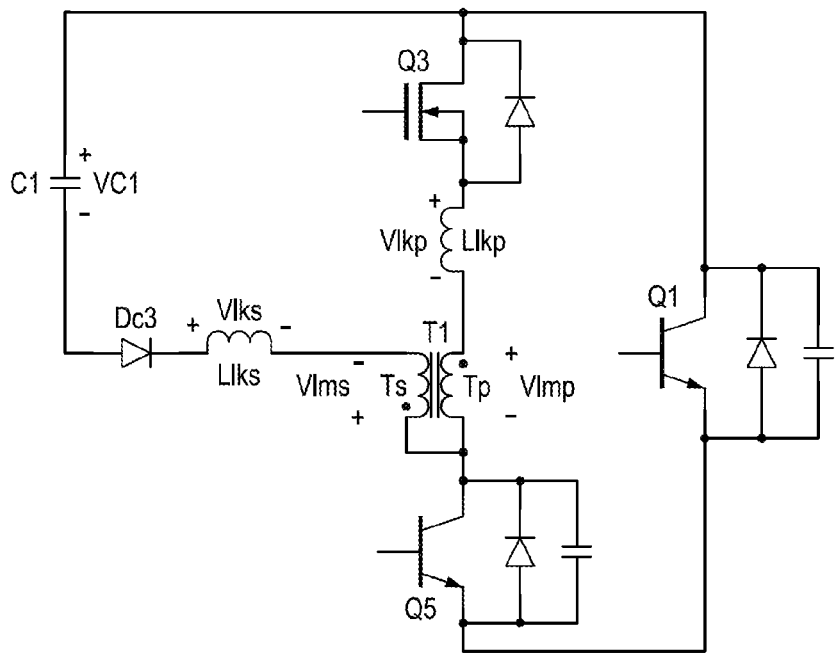
FIG. 4 illustrates an equivalent circuit of the soft switching network in accordance with various embodiments of the present disclosure.

FIG. 4 illustrates an equivalent circuit of the soft switching network in accordance with various embodiments of the present disclosure. The equivalent circuit includes both the primary side leakage inductance and the secondary side leakage inductance. As show in FIG. 4, the primary side leakage inductance Llkp is inserted between the auxiliary switch Q3 and the primary side Tp of the transformer T1. Likewise, the secondary side leakage inductance Llks is inserted between the second auxiliary diode Dc3 and the secondary side Ts of the transformer T1.

By applying Kirchoff's voltage law (KVL) to the circuit shown in FIG. 4, KVL yields the following equations:

$$Vlkp + Vlmp = 0 \tag{1}$$

$$-Vlks + Vlms = VC1 \tag{2}$$

Assume the primary side Tp and the secondary side Ts of the transformer may be of the same winding turns. Therefore, the voltage across the primary side Tp is equal to the voltage across the secondary side Ts. In other words, Vlmp is equal to Vlms. Equation (2) subtracted by equation (1) yields the following equation:

$$VC1 = -Vlks - Vlkp \tag{3}$$

In addition, the currents and the voltages of the leakage inductances may satisfy the following conditions:

$$Vlkp = Llkp \frac{dIp}{dt} \tag{4}$$

$$Vlks = Llks \frac{dIs}{dt} \tag{5}$$

wherein Ip is the current flowing through the primary side Tp of the transformer T1 and Is is the current flowing through the secondary side Ts of the transformer T1.

Since Ip and Is are the primary side current and the secondary side current of the transformer T1 respectively, the variation of Ip is proportional to the variation of Is. As such, equation (4) and equation (5) may yield the following relationship between Vlkp and Vlks:

$$Vlkp = Vlks \tag{6}$$

Equation (3) shown above can be simplified through substitution. In other words, equation (6) may be used to simplify equation (3). Equation (3) can be simplified as:

$$VC1 = -2Vlkp = -2Vlks \tag{7}$$

Equation (7) indicates that the voltage VC1 is used to reset the current flowing through the secondary side leakage inductance. Referring back to FIG. 4, the voltage VC1 leads to a resetting process of the current IDc3 during the time interval from t4 to t6 (shown in FIG. 5). In order to achieve a zero current transition of the auxiliary switch Q3, the turn-off of the auxiliary switch Q3 may be selected at a time instant after the current of IQ3 drops to zero at t6 (shown in FIG. 5). As shown in FIG. 5, the auxiliary switch Q3 is turned off at the time instant t7.

Referring back to FIG. 5, one advantageous feature of the soft switching network 104 is that the switch Q1 may achieve a zero voltage turn-on and the auxiliary switch Q3 is of a zero current turn-off. Such zero voltage switching and zero current switching help to reduce the total power losses of the soft switching inverter system 100 shown in FIG. 1.

Figure 6:
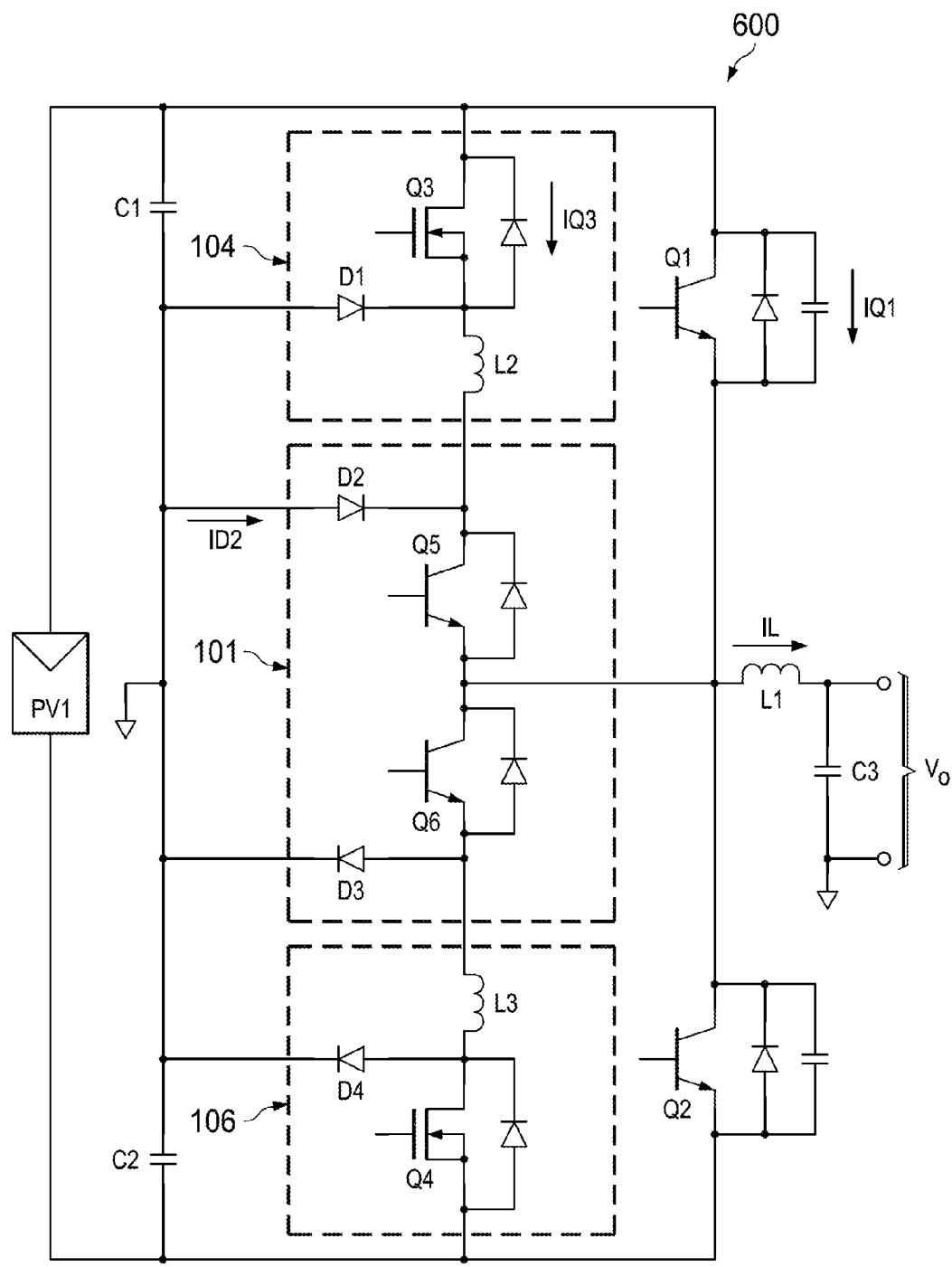
FIG. 6 illustrates a schematic diagram of a second illustrative embodiment of the soft switching inverter system shown in FIG. 2 in accordance with various embodiments of the present disclosure.

FIG. 6 illustrates a schematic diagram of a second illustrative embodiment of the soft switching inverter system shown in FIG. 2 in accordance with various embodiments of the present disclosure. The soft switching inverter system 600 shown in FIG. 5 is similar to the soft switching inverter system 300 shown in FIG. 3 except that the soft switching networks 104 and 106 are of a different system configuration. As shown in FIG. 6, the soft switching network 104 may comprise an inductor L2, an auxiliary diode D1 and an auxiliary switch Q3. The detailed operation principle of the soft switching inverter system 600 will be described below with respect to FIG. 7.

Figure 7:
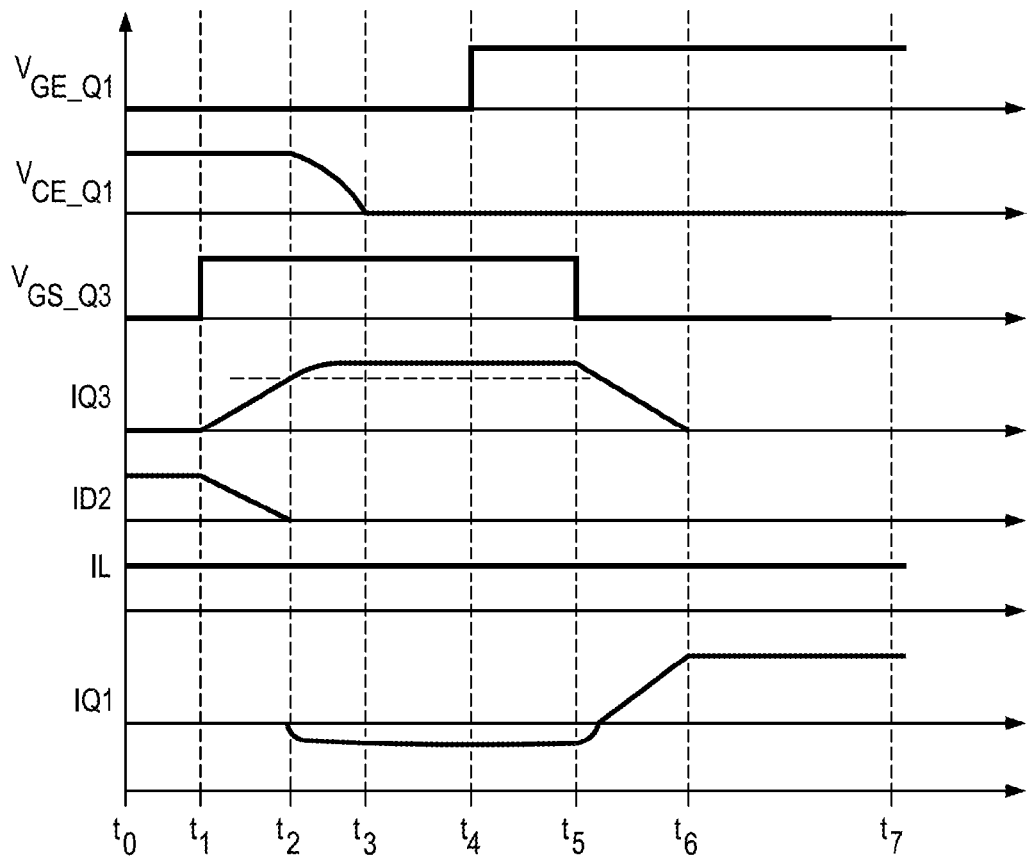
FIG. 7 illustrates a timing diagram of various signals in the soft switching inverter shown in FIG. 6 in accordance with various embodiments of the present disclosure.

FIG. 7 illustrates a timing diagram of various signals in the soft switching inverter shown in FIG. 6 in accordance with various embodiments of the present disclosure. The timing diagram of FIG. 7 is similar to that shown in FIG. 5 except that the auxiliary switch Q3 may not achieve a zero current turn-off. More particularly, at the time instant t3, the voltage across the switch Q1 is discharged to zero. The switch Q1 may be turned on immediately or slightly later depending on design and application needs.

After the switch Q1 is turned on at the time instant t4, the inductor L2 may be shorted by a conductive path formed by switches Q1, Q3 and Q5. Because the inductor L2 is shorted, the current flowing through the inductor L2 is kept constant during the time interval from t4 to t5. It should be noted that the soft switching network 104 lacks a mechanism of resetting the current flowing through the inductor L2. Therefore, the current flowing through the inductor L2 may not drop until the auxiliary switch Q3 is turned off.

FIG. 7 shows the auxiliary switch Q3 is turned off at the time instant t5, wherein the current flowing through auxiliary switch Q3 is greater than zero. It should be noted that during the time internal form t3 to t5 the auxiliary switch Q3 may operate under a high current stress, which is slightly greater than that of the load current IL.

Figure 8:
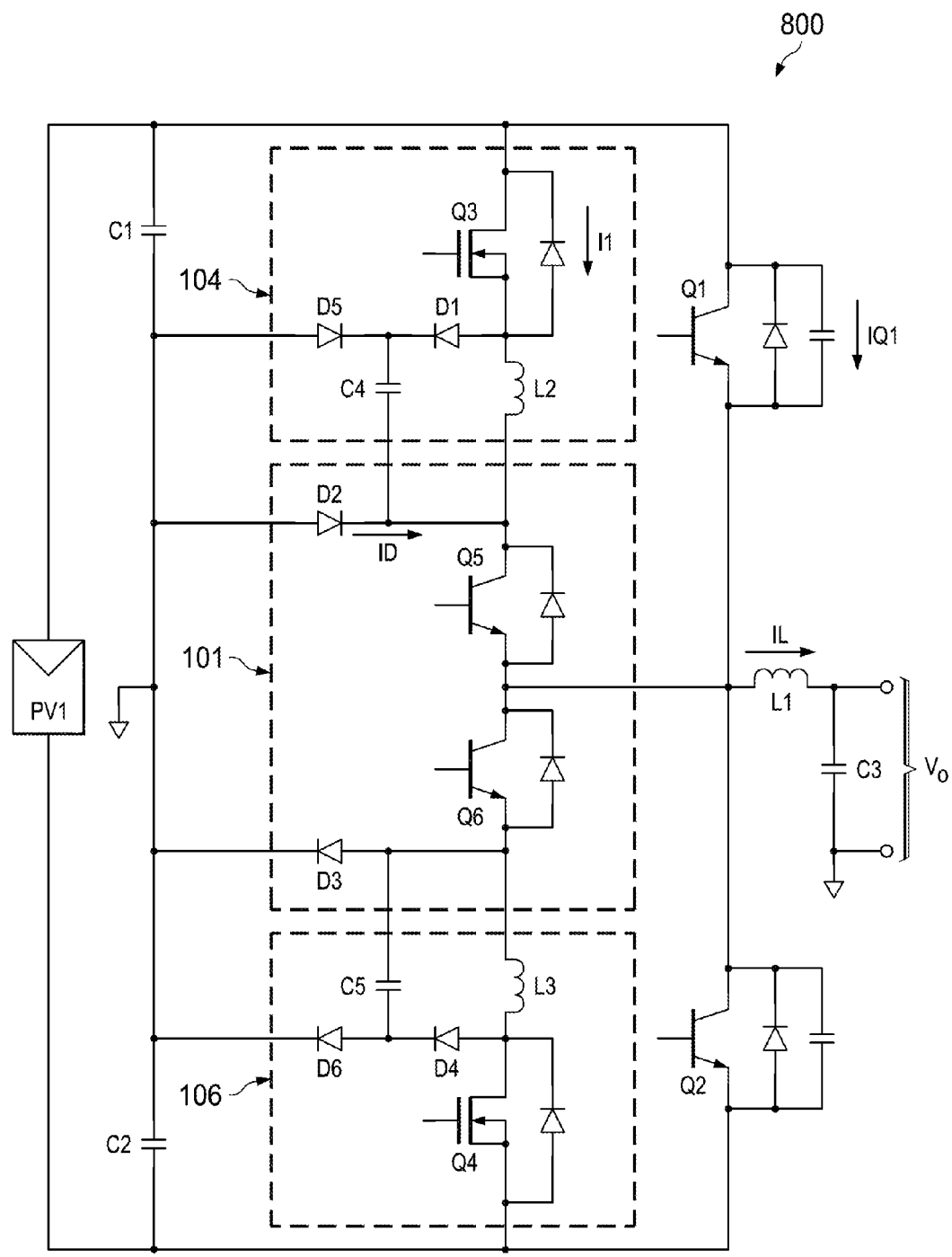
FIG. 8 illustrates a schematic diagram of a third illustrative embodiment of the soft switching inverter system shown in FIG. 2 in accordance with various embodiments of the present disclosure.

FIG. 8 illustrates a schematic diagram of a third illustrative embodiment of the soft switching inverter system shown in FIG. 2 in accordance with various embodiments of the present disclosure. The soft switching inverter system 800 shown in FIG. 8 is similar to the soft switching inverter system 600 shown in FIG. 6 except that the soft switching networks 104 and 106 are of a different system configuration.

As shown in FIG. 8, in comparison with FIG. 6, the soft switching network 104 may comprise one more capacitor C4 and one more diode D5. The diodes D1 and D5 are connected in series and further coupled between a first terminal of the inductor L2 and ground. The diode D2 is coupled between a second terminal of the inductor L2 and ground. The auxiliary capacitor C4 is coupled between the common node of the diodes D1 and D5, and the second terminal of the inductor L2. The detailed operation principle of the soft switching inverter system 800 will be described below with respect to FIG. 10.

Figure 10:
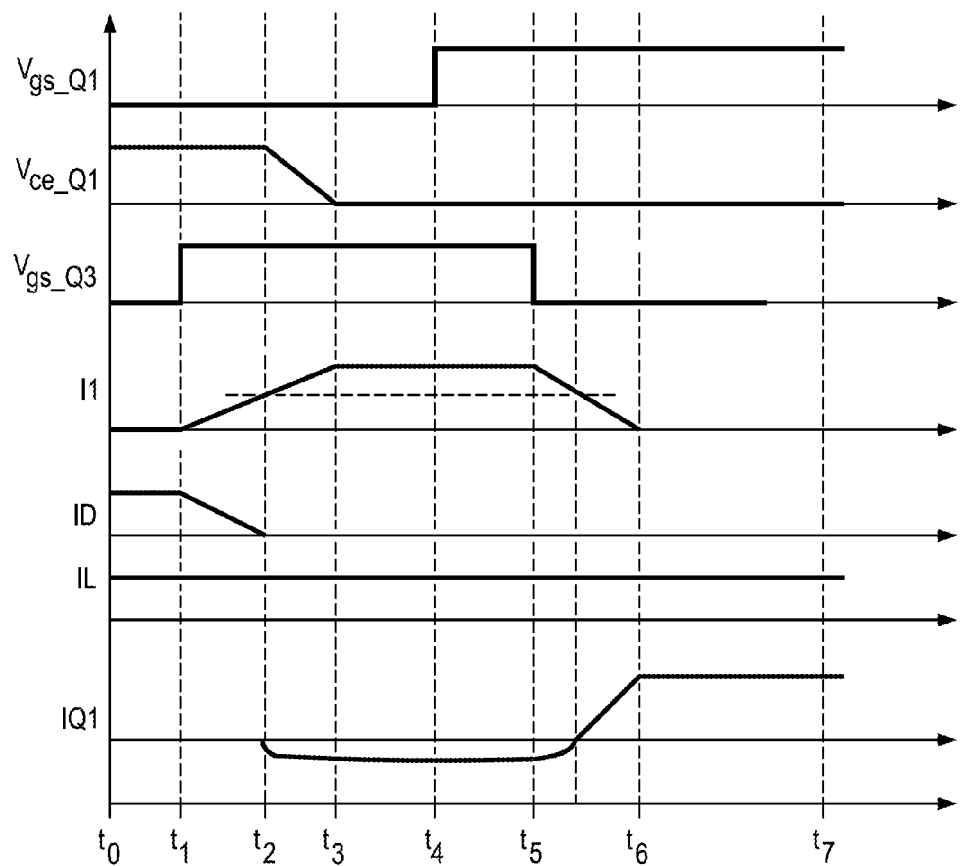
FIG. 10 illustrates a timing diagram of various signals in the soft switching inverter shown in FIG. 8 in accordance with various embodiments of the present disclosure.

FIG. 10 illustrates a timing diagram of various signals in the soft switching inverter shown in FIG. 8 in accordance with various embodiments of the present disclosure. The timing diagram of FIG. 10 is similar to that shown in FIG. 7, and hence is not discussed in further detail herein.

It should be noted that the auxiliary capacitor C4 may help to reduce the turn-off losses of the switch Q3. More particularly, at the time instant t5, the auxiliary switch Q3 has been turned on. Once the auxiliary switch Q3 is turned off, the current flowing through the inductor L2 flows in a freewheeling path formed by capacitor C1, diode D5, diode D1, inductor L2, switch Q5 and switch Q1. Such a freewheeling path connects the auxiliary capacitor C4 and the auxiliary switch Q3 together in parallel. Such a parallel-connected circuit helps to reduce the switching losses of the auxiliary switch Q3 during a turn-off process.

Figure 9:
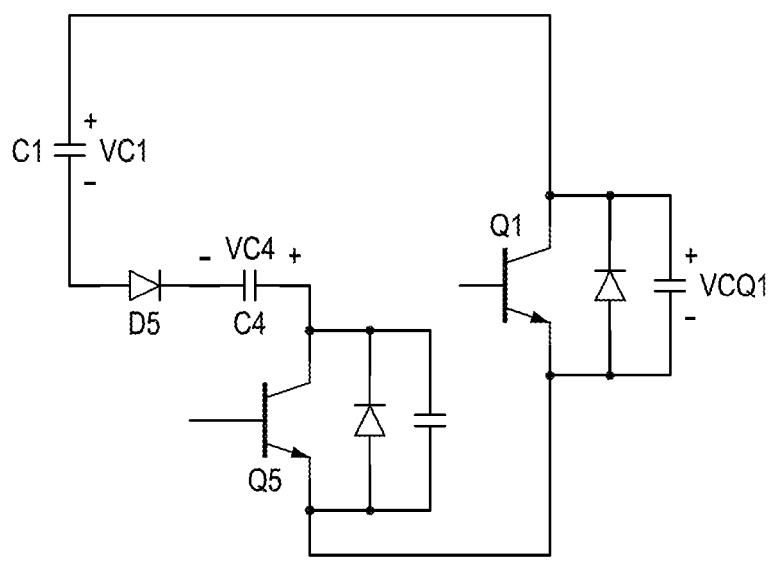
FIG. 9 illustrates the equivalent circuit of the resetting process after the switch Q1 is turned off in accordance with various embodiments of the present disclosure.

It should further be noted that the auxiliary capacitor C4 may be reset during each switching cycle. In particular, after the auxiliary capacitor C4 is connected in parallel with the auxiliary switch Q3, a voltage is built upon the auxiliary capacitor C4. In order to connect the auxiliary capacitor C4 with the auxiliary switch Q3 in the next switching cycle, the auxiliary capacitor C4 should be reset prior to the next turn-off of the auxiliary switch Q3. FIG. 9 illustrates an equivalent circuit for explaining in detail the resetting process of the auxiliary capacitor C4.

FIG. 9 illustrates the equivalent circuit of the resetting process after the switch Q1 is turned off in accordance with various embodiments of the present disclosure. After switch Q1 is turned off, the output capacitance of the switch Q1 and the capacitor C4 are connected in series as shown in FIG. 9.

By applying Kirchoff's voltage law (KVL) to the circuit shown in FIG. 9, KVL yields the following equations:

$$VC1 = VC4 + VCQ1 \tag{8}$$

After the switch Q1 is turned off, the voltage across the switch Q1 will increase to a level approximately equal to the input dc source VC1. As a result, the voltage across the auxiliary capacitor C4 will be discharged to a voltage level approximately equal to zero. In other words, the auxiliary capacitor C4 is reset prior to a next turn-off process of the auxiliary switch Q3.

Figure 11:
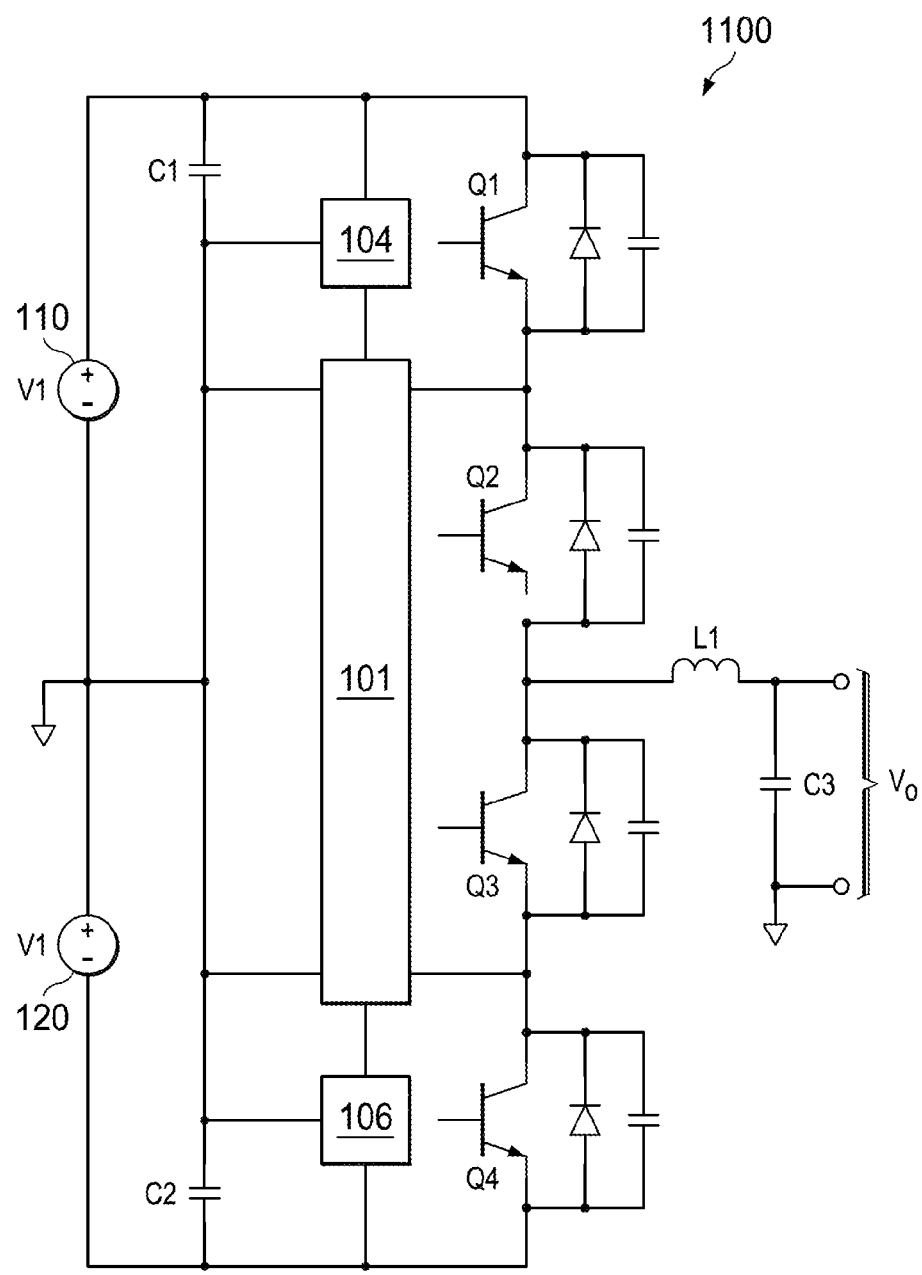
FIG. 11 illustrates a block diagram of another illustrative embodiment of the soft switching inverter system shown in FIG. 1 in accordance with various embodiments of the present disclosure.

FIG. 11 illustrates a block diagram of another illustrative embodiment of the soft switching inverter system shown in FIG. 1 in accordance with various embodiments of the present disclosure. The soft switching inverter system 1100 is similar to the soft switching inverter system 200 shown in FIG. 2 except that there may be one more switch connected in series between the output filter and the input dc source. In particular, the switches Q1 and Q2 are connected in series and further coupled between the output filter and the first input dc source 110. The switches Q3 and Q4 are connected in series and further coupled between the output filter and the second input dc source 120. The freewheeling apparatus 101 is coupled between the output filter and the common node of the input dc sources 110 and 120.

The soft switching inverter system 1100 may further comprise the first soft switching network 104 and the second soft switching network 106. The soft switching networks 104 and 106 are employed to achieve a zero voltage transition at switches Q1 and Q4 respectively. The structure and operation principle of the soft switching network are similar to those shown in FIG. 2, and hence are not discussed in further detail herein.

Figure 12:
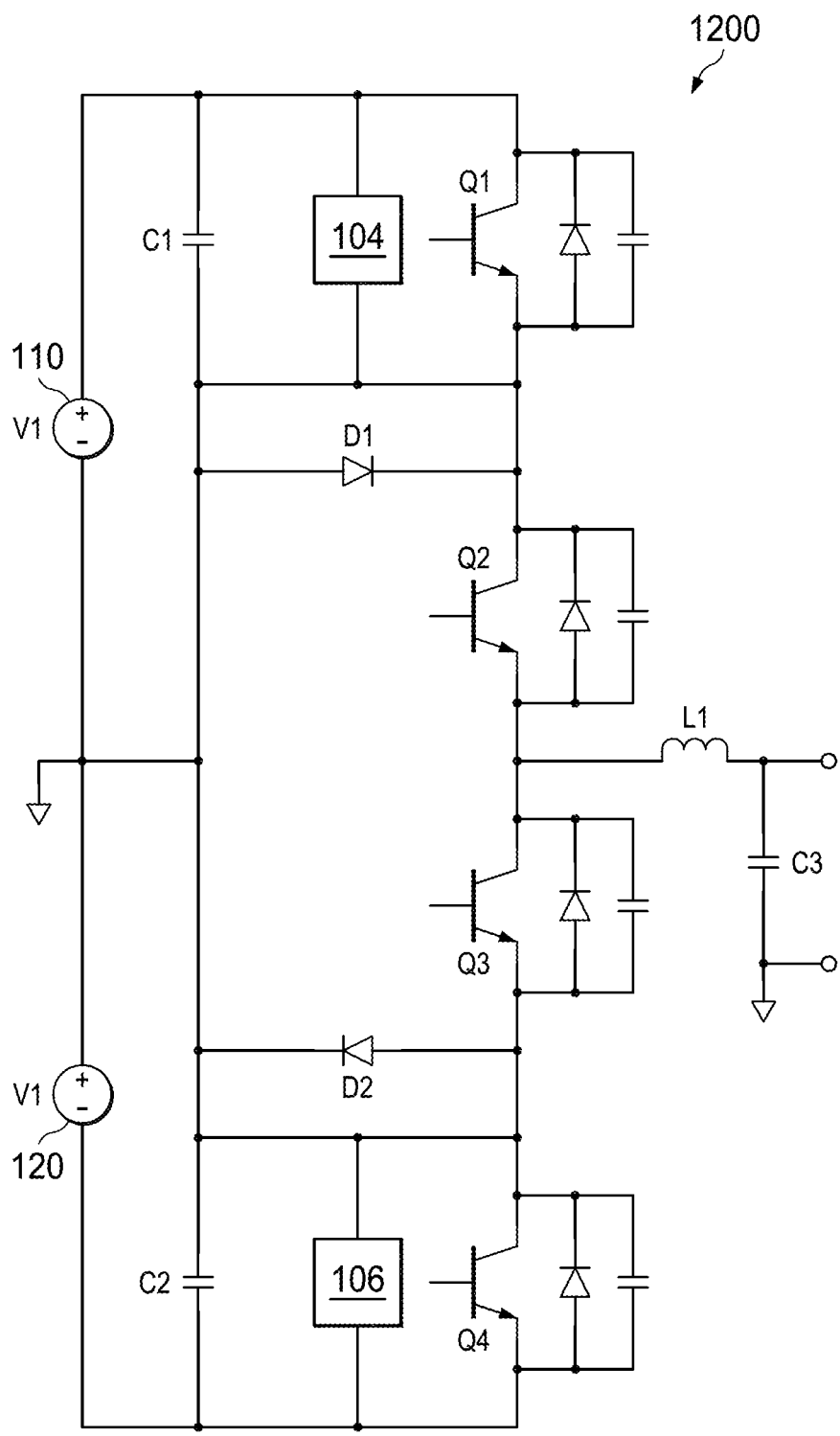
FIG. 12 illustrates a schematic diagram of a first illustrative embodiment of the soft switching inverter system shown in FIG. 11 in accordance with various embodiments of the present disclosure.

FIG. 12 illustrates a schematic diagram of a first illustrative embodiment of the soft switching inverter system shown in FIG. 11 in accordance with various embodiments of the present disclosure. The freewheeling apparatus 101 comprises diodes D1 and D2. As shown in FIG. 12, the diode D1 forms a first freewheeling route connected between ground and the common node of the switches Q1 and Q2. In some embodiments, the first freewheeling route may provide a conductive path for the current flowing in the switch Q1 after the switch Q1 is turned off.

Likewise, diode D2 forms a second freewheeling route connected between ground and the common node of the switches Q3 and Q4. In some embodiments, the second freewheeling route may provide a conductive path for the current flowing in the switch Q4 after the switch Q4 is turned off.

It should be noted that the schematic diagram of the freewheeling apparatus 101 described above is merely an exemplary process and is not meant to limit the current embodiments. One of ordinary skill in the art would recognize many variations, alternatives, and modifications. For example, the diodes D1 and D2 may be replaced by two switches respectively.

Figure 13:
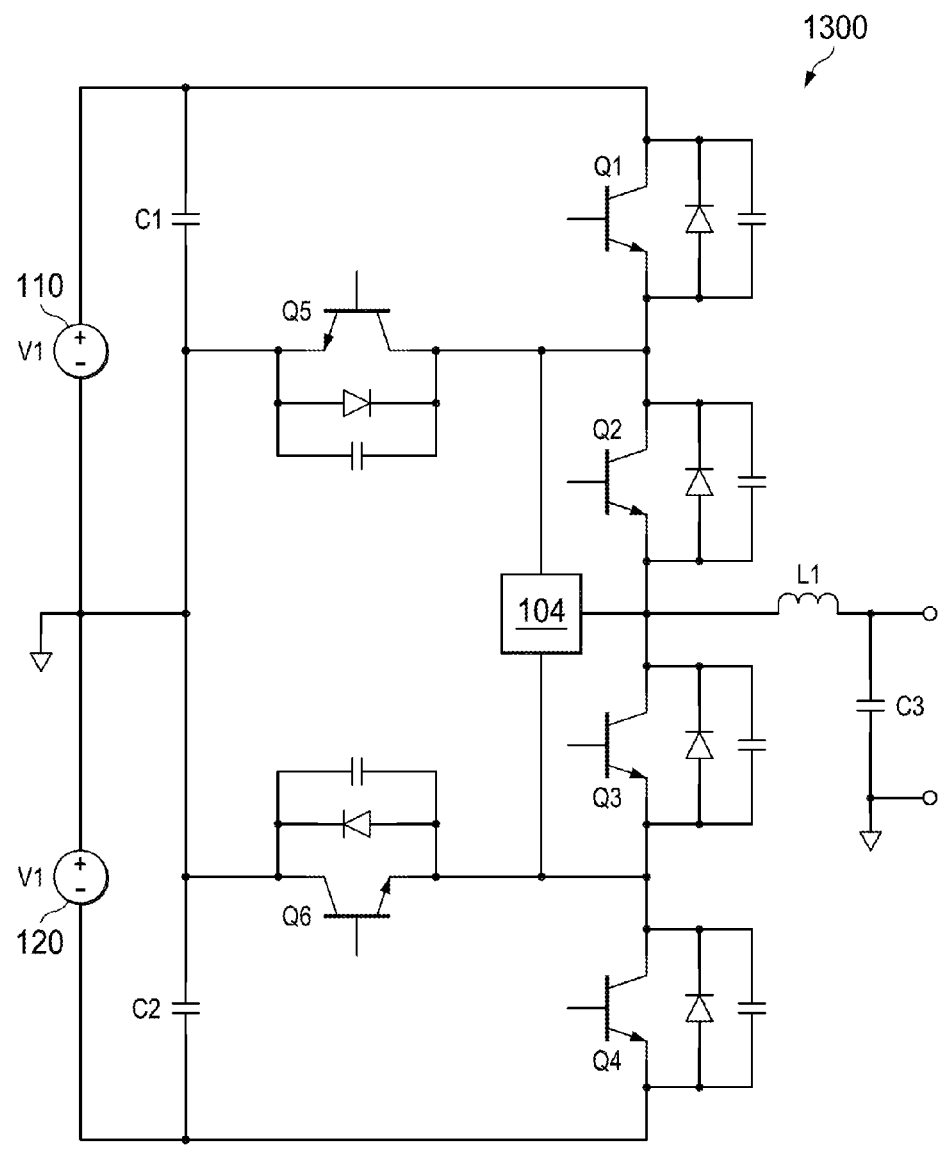
FIG. 13 illustrates a schematic diagram of a second illustrative embodiment of the soft switching inverter system shown in FIG. 11 in accordance with various embodiments of the present disclosure.

FIG. 13 illustrates a schematic diagram of a second illustrative embodiment of the soft switching inverter system shown in FIG. 11 in accordance with various embodiments of the present disclosure. The freewheeling apparatus 101 comprises switches Q5 and Q6. As shown in FIG. 13, the switch Q5 forms a first freewheeling route connected between ground and the common node of the switches Q1 and Q2. In some embodiments, the first freewheeling route may provide a conductive path for the current flowing in the switch Q1 after the switch Q1 is turned off.

Likewise, the switch Q6 forms a second freewheeling route connected between ground and the common node of the switches Q3 and Q4. In some embodiments, the second freewheeling route may provide a conductive path for the current flowing in the switch Q4 after the switch Q4 is turned off.

It should be noted that a single soft switching network 104 is capable of achieving zero voltage switching of the main switches such as switches Q1 and Q4. As shown in FIG. 13, the soft switching network 104 is coupled to the common node of Q1 and Q2 and the common node of Q3 and Q4.

Figure 14:
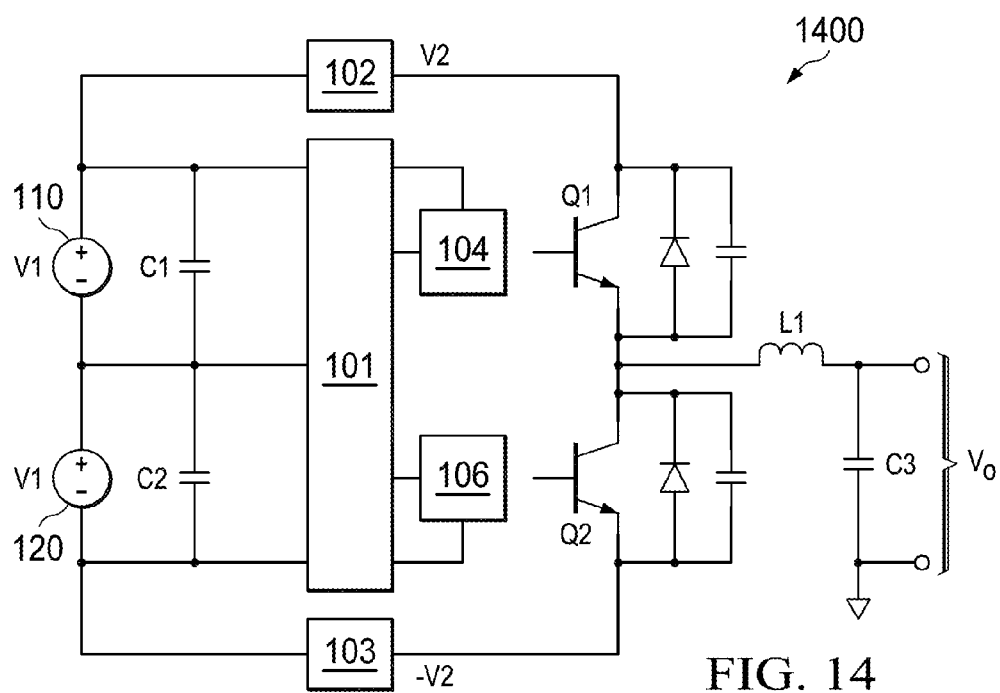
FIG. 14 illustrates a block diagram of yet another illustrative embodiment of the soft switching inverter system shown in FIG. 1 in accordance with various embodiments of the present disclosure.

FIG. 14 illustrates a block diagram of yet another illustrative embodiment of the soft switching inverter system shown in FIG. 1 in accordance with various embodiments of the present disclosure. The soft switching inverter system 1400 is similar to the soft switching inverter system 200 shown in FIG. 2 except that there may be a first boost apparatus 102 and a second boost apparatus 103 connected in series with the first input dc source 110 and the second input dc source 120 respectively.

FIG. 14 illustrates a block diagram of a five-level inverter system in accordance with an embodiment. The five-level inverter system 1400 comprises a first input dc source 110 having an output voltage V1, a second input dc source 120 having an output voltage −V1, a first boost apparatus 102 having an output voltage V2, a second boost apparatus 103 having an output voltage −V2 and a freewheeling apparatus 101. The first boost apparatus 102 and the second boost apparatus 103 are coupled to the first input dc source 110 and the second input dc source 120 respectively. In addition, the first boost apparatus 102 and the second boost apparatus 103 convert the output voltages of the first input dc source 110 and the second input dc source 120 to V2 and −V2 respectively.

Each switch is configured such that a staircase waveform is generated at the input of the output filter by using different combinations of the switches. In particular, when the switch Q1 is turned on, the output voltage Vo is coupled to the output of the first boost apparatus 102. As a result, the output voltage Vo has a voltage potential of V2. In contrast, when the switch Q2 is turned on, the output voltage Vo is coupled to the output of the second boost apparatus 103. As a result, the output voltage Vo has a voltage potential of −V2. Furthermore, the output voltage Vo may be of a voltage potential equal to either V1 or −V1 through the turn-on of the switches in the freewheeling apparatus 101. The detailed operation of the five-level inverter 1400 will be described below with respect to FIGS. 15-20.

The first boost apparatus 102 and the boost apparatus 103 may be implemented by using step up circuits such as boost dc/dc converters. A boost dc/dc converter is formed by an input inductor, a low side switch and a blocking diode. The detailed configuration of the boost dc/dc converter will be described below with respect to FIGS. 15-20.

It should be noted that boost dc/dc converters are merely an example to implement the first boost apparatus 102 and the second boost apparatus 103. Other boost topologies are also within the contemplated scope of the invention. A boost dc/dc converter is simply one manner of generating a higher voltage from the input dc source (e.g., V1) and that other and alternate embodiment boost topologies could be employed (such as employing a switched capacitor voltage doubler) and that other circuits, (e.g., a charge pump voltage doubler, etc.) could be employed for this function.

It should further be noted that while FIG. 14 illustrates the five-level inverter system 1400 with two boost apparatuses (e.g., the first boost apparatus 102 and the second boost apparatus 103), the five-level inverter system 1400 could accommodate any number of boost apparatuses. The number of boost apparatuses illustrated herein is limited solely for the purpose of clearly illustrating the inventive aspects of the various embodiments. The present invention is not limited to any specific number of boost apparatuses. One of ordinary skill in the art would recognize many variations, alternatives, and modifications. For example, additional boost apparatuses may be employed to achieve an output staircase waveform having additional voltage levels.

In sum, FIG. 14 illustrates a method of operating a five-level inverter comprising generating a first voltage higher than an input positive dc bus by using a first boost apparatus 102, generating a second voltage lower than an input negative dc bus by using a second boost apparatus 103, forming a five level input voltage source using the first input dc source 110, the input positive dc bus, ground, the input negative dc bus and the second input dc source 120 and configuring a plurality of switches to generate an ac waveform, wherein the plurality of switches are coupled to the five level input voltage source.

The method further comprises generating the first voltage using a first boost dc/dc converter and generating the second voltage using a second boost dc/dc converter. In addition, the method comprises connecting a first switch Q1 between an input of the output filter and the first boost apparatus 102, connecting a second switch Q2 between the input of the output filter and the second boost apparatus 103.

Figure 15:
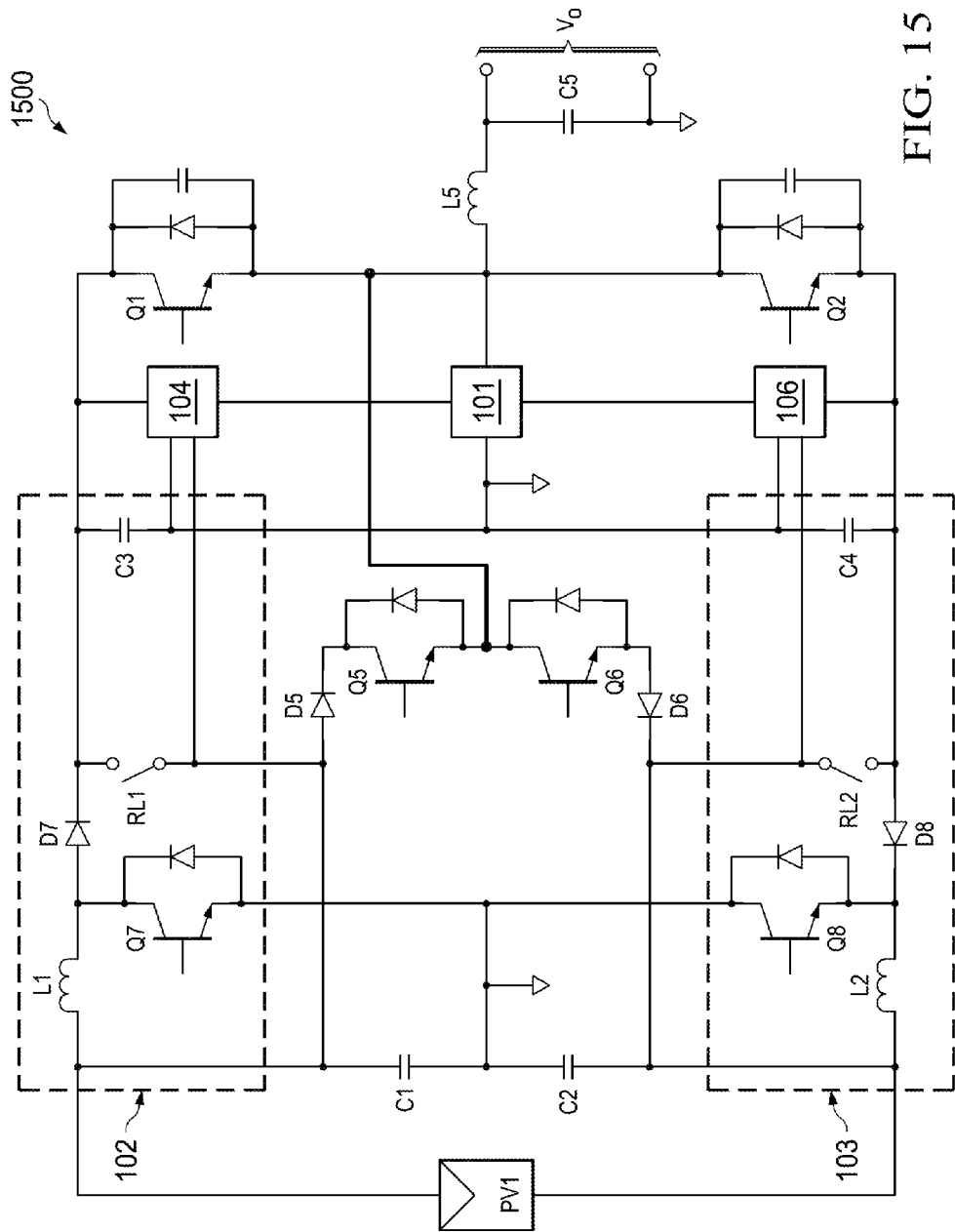
FIG. 15 illustrates a schematic diagram of the soft switching inverter system shown in FIG. 14 in accordance with various embodiments of the present disclosure.

FIG. 15 illustrates a schematic diagram of the soft switching inverter system shown in FIG. 14 in accordance with various embodiments of the present disclosure. The soft switching inverter system 1500 may comprise a first soft switching network 104, a second soft switching network 106 and a freewheeling apparatus 101. In accordance with some embodiments, the structures and operation principles of the first soft switching network 104, the second soft switching network 106 and the freewheeling apparatus 101 are similar to those shown in FIG. 2.

The soft switching inverter system 1500 may further comprise a first boost apparatus 102, a second boost apparatus 103 and another freewheeling circuit. Both the first boost apparatus 102 and the second boost apparatus 103 may be a same structure. For simplicity, only the first boost apparatus 102 is described below in detail.

As shown in FIG. 14, the first boost dc/dc converter 102 is formed by an input inductor L1, a low side switch Q7, a blocking diode D7 and an output capacitor C3. A controller (not shown) may control the turn-on duty cycle of the low side switch Q7 so as to regulate the output voltage across the output capacitor C3. The detailed operation principles of boost dc/dc converters are well known in the art, and hence are not discussed in further detail to avoid unnecessary repetition.

The diode D5, switch Q5, switch Q6 and diode D6 form another group of freewheeling routes. The operation principles of this group of freewheeling routes are similar to those shown in FIG. 3, and hence are not discussed in detail herein to void unnecessary repetition.

The relays RL1 and RL2 are included to provide one additional operation mode. In particular, when the input voltage is higher than its normal operating voltage, the boost apparatuses 102 and 103 may be bypassed by the relays RL1 and RL2 respectively. As such, the total power losses of the soft switching inverter system 1500 may be reduced.

Figure 16:
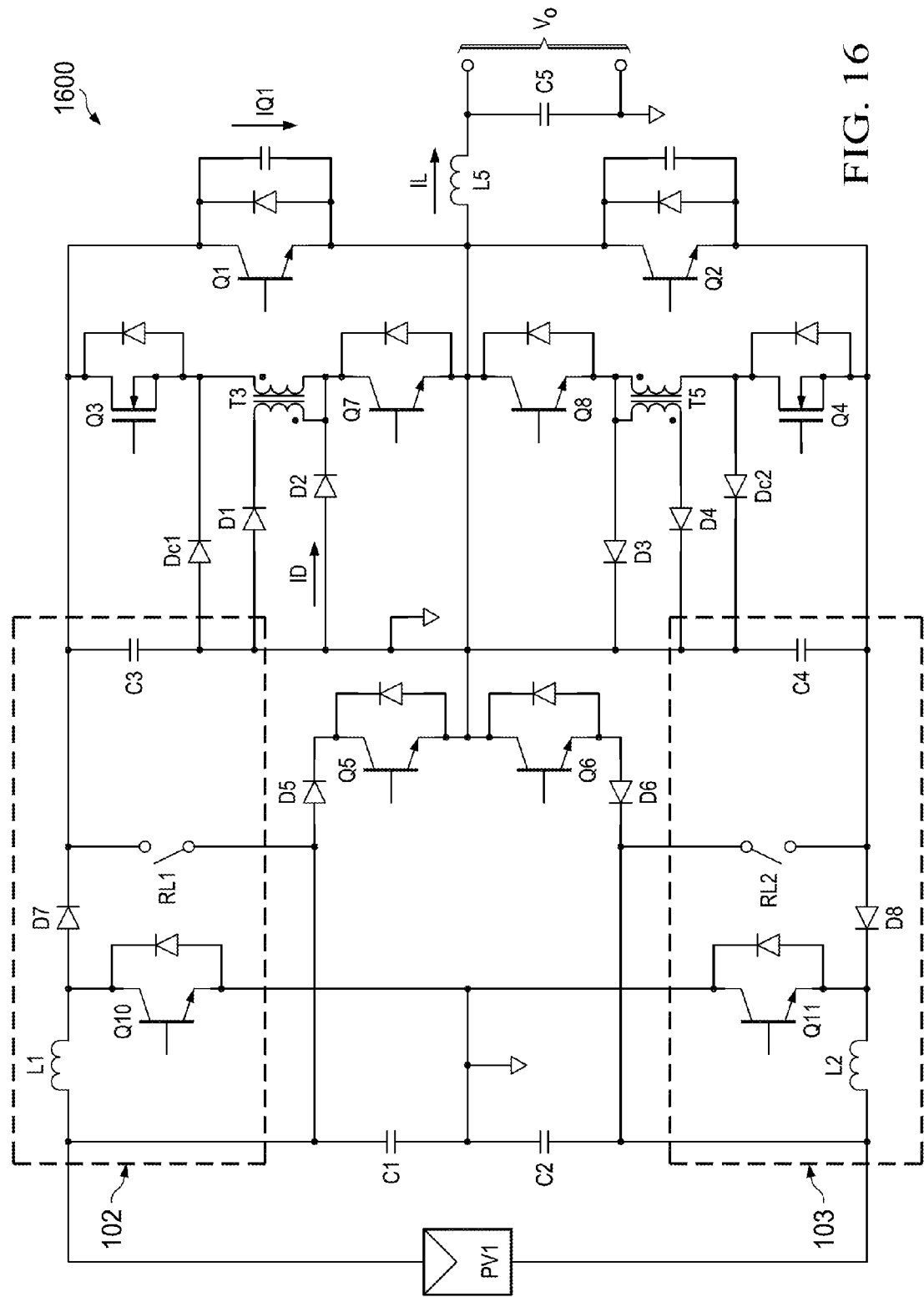
FIG. 16 illustrates a schematic diagram of a first illustrative embodiment of the soft switching inverter system shown in FIG. 15 in accordance with various embodiments of the present disclosure.

FIG. 16 illustrates a schematic diagram of a first illustrative embodiment of the soft switching inverter system shown in FIG. 15 in accordance with various embodiments of the present disclosure. The soft switching network 104 and the soft switching network 106 shown in FIG. 16 are similar to those shown in FIG. 3 except that the soft switching inverter system 1600 may be of five input voltage levels rather than three input voltage levels. The auxiliary switch Q3 in the soft switching network is coupled to the output of the first boost apparatus 102. The operation principle of the soft switching network 104 is similar to that shown in FIGS. 3-5, hence are not discussed again herein to avoid repetition.

Figure 17:
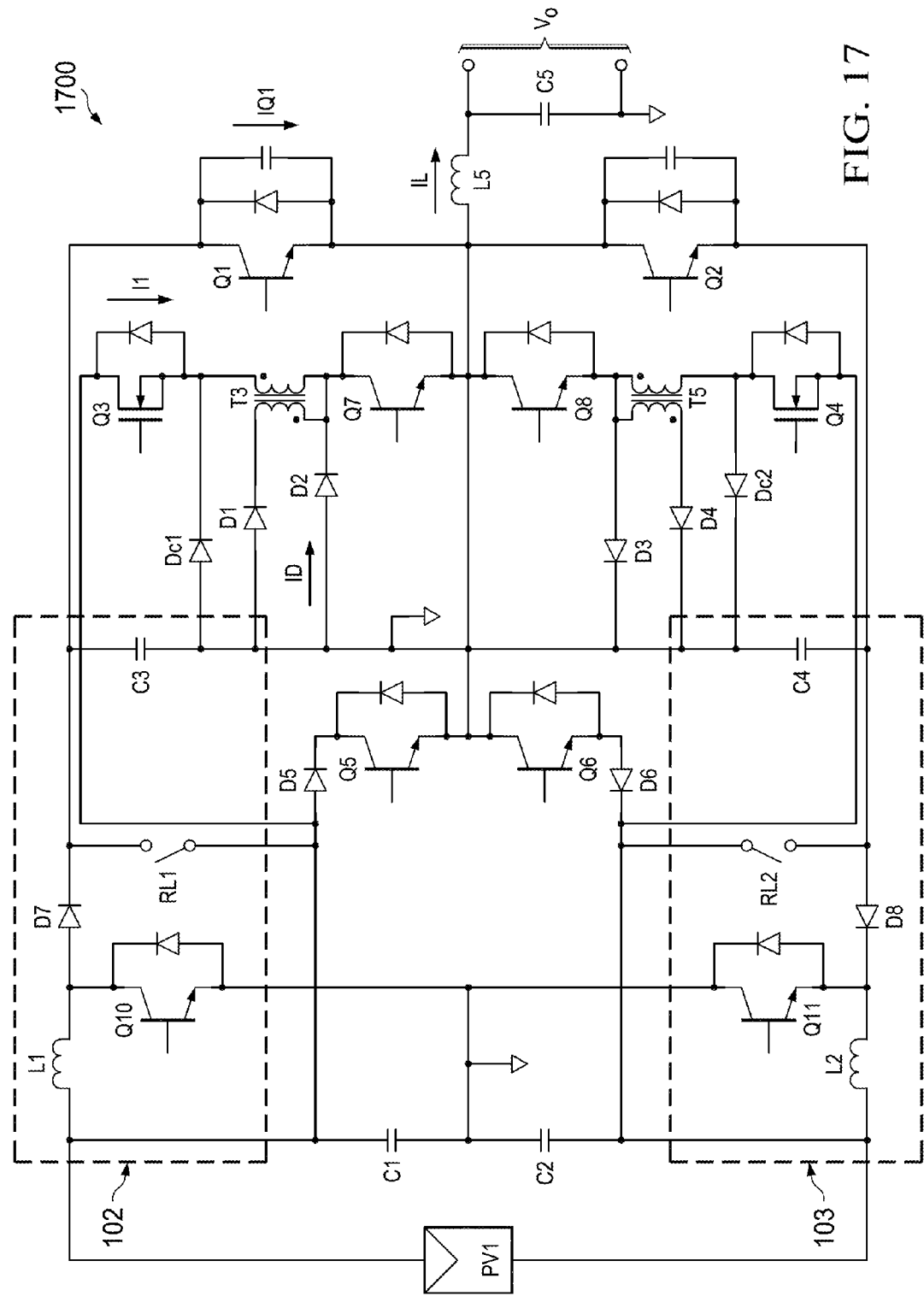
FIG. 17 illustrates a schematic diagram of a second illustrative embodiment of the soft switching inverter system shown in FIG. 15 in accordance with various embodiments of the present disclosure.

FIG. 17 illustrates a schematic diagram of a second illustrative embodiment of the soft switching inverter system shown in FIG. 15 in accordance with various embodiments of the present disclosure. The soft switching network 104 and the soft switching network 106 shown in FIG. 17 are similar to those shown in FIG. 16 except that the auxiliary switch such as Q3 in the soft switching network is coupled to the input of the first boost apparatus 102. The operation principle of the soft switching network 104 is similar to that shown in FIGS. 3-5, hence are not discussed again herein to avoid repetition.

Figure 18:
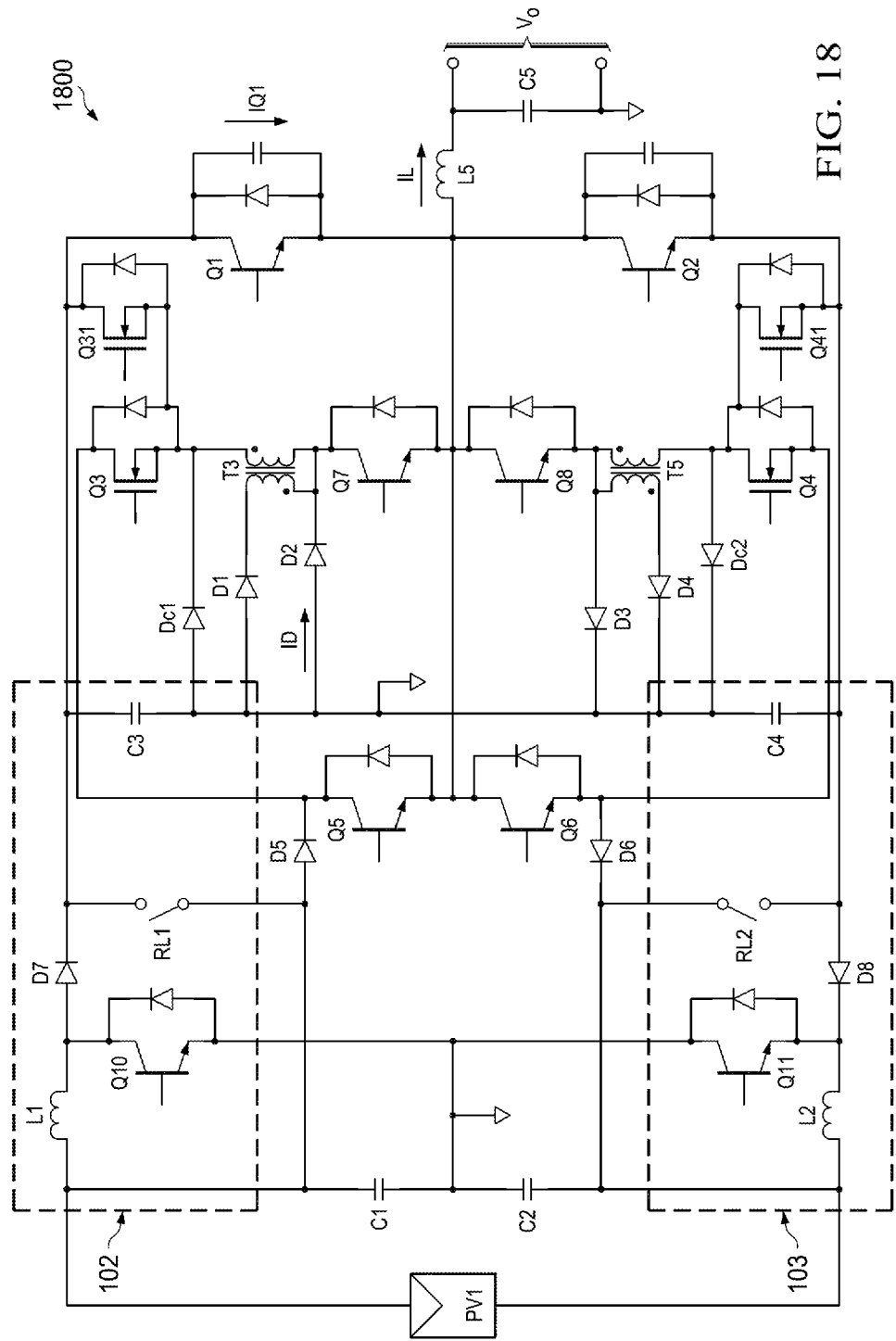
FIG. 18 illustrates a schematic diagram of a third illustrative embodiment of the soft switching inverter system shown in FIG. 15 in accordance with various embodiments of the present disclosure.

FIG. 18 illustrates a schematic diagram of a third illustrative embodiment of the soft switching inverter system shown in FIG. 15 in accordance with various embodiments of the present disclosure. The soft switching network 104 and the soft switching network 106 shown in FIG. 18 are similar to those shown in FIG. 16 except that there may be two auxiliary switches such as Q3 and Q31 in each soft switching network. In addition, these two auxiliary switches such as Q3 and Q31 in the soft switching network are coupled to the input and the output of the boost apparatus respectively. The operation principle of the soft switching network is similar to that shown in FIGS. 3-5, hence are not discussed again herein to avoid repetition.

Figure 19:
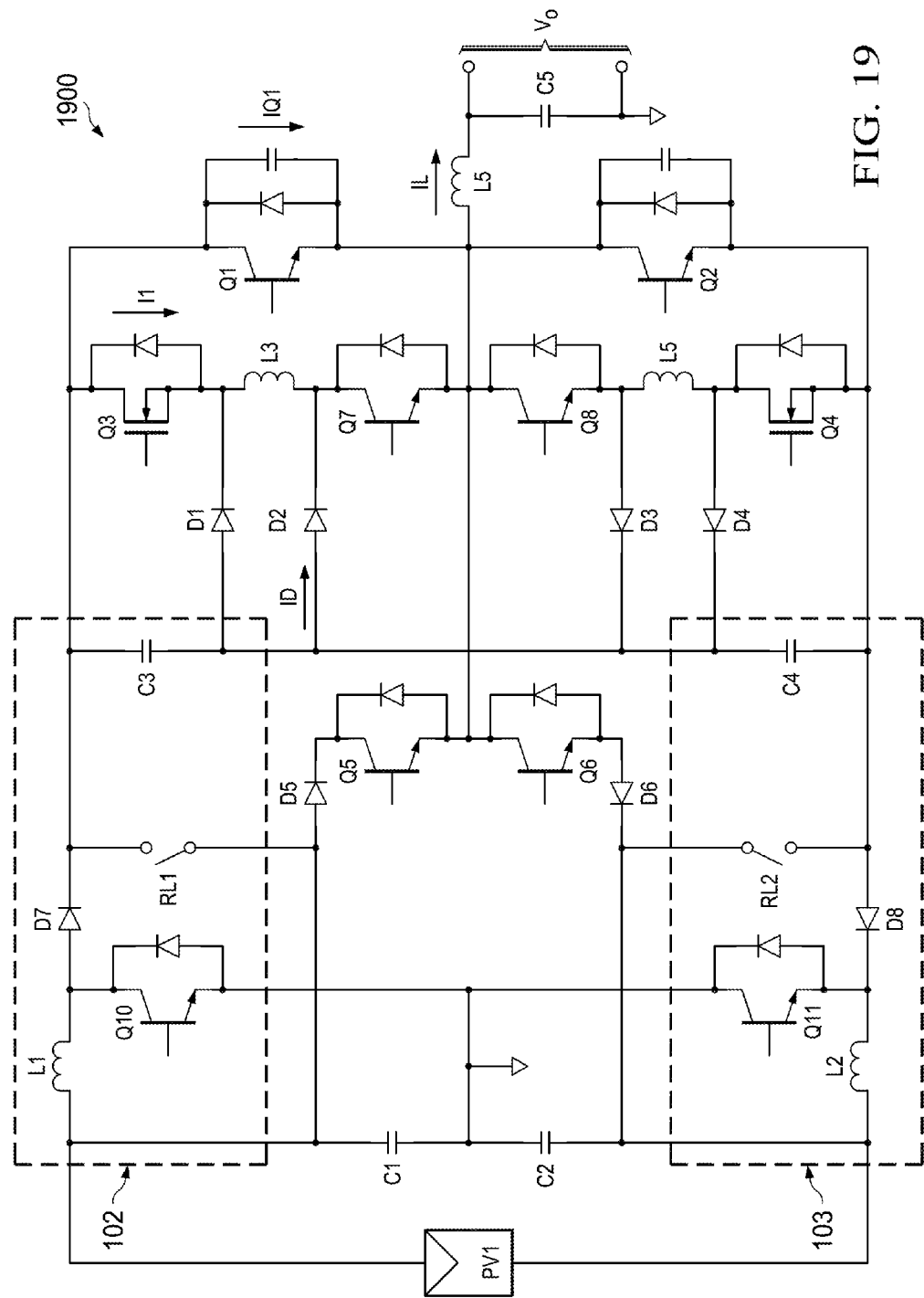
FIG. 19 illustrates a schematic diagram of a fourth illustrative embodiment of the soft switching inverter system shown in FIG. 15 in accordance with various embodiments of the present disclosure.

FIG. 19 illustrates a schematic diagram of a fourth illustrative embodiment of the soft switching inverter system shown in FIG. 15 in accordance with various embodiments of the present disclosure. The soft switching network 104 and the soft switching network 106 shown in FIG. 19 are similar to those shown in FIG. 6 except that the soft switching inverter system 1900 may be of five input voltage levels rather than three input voltage levels. The auxiliary switch Q3 in the soft switching network 104 is coupled to the output of the first boost apparatus 102. The operation principle of the soft switching network is similar to that shown in FIGS. 6-7, hence are not discussed again herein to avoid repetition.

Figure 20:
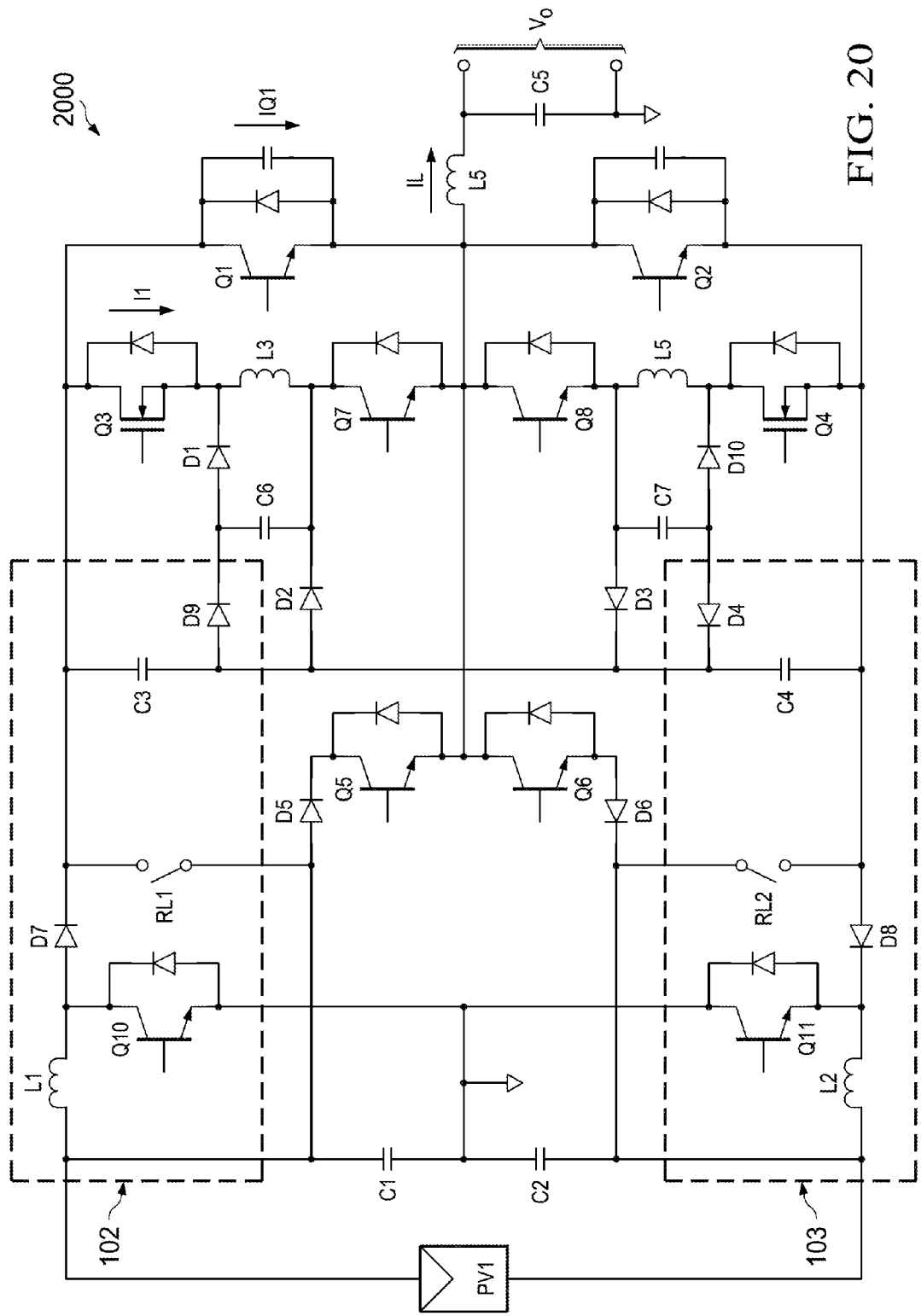
FIG. 20 illustrates a schematic diagram of a fifth illustrative embodiment of the soft switching inverter system shown in FIG. 15 in accordance with various embodiments of the present disclosure.

FIG. 20 illustrates a schematic diagram of a fifth illustrative embodiment of the soft switching inverter system shown in FIG. 15 in accordance with various embodiments of the present disclosure. The soft switching network 104 and the soft switching network 106 shown in FIG. 20 are similar to those shown in FIG. 8 except that the soft switching inverter system 2000 may be of five input voltage levels rather than three input voltage levels. The auxiliary switch such as auxiliary switch Q3 in the soft switching network 104 is coupled to the output of the first boost apparatus 102. The operation principle of the soft switching network is similar to that shown in FIGS. 8-10, hence are not discussed again herein to avoid unnecessary repetition.

Figure 21:
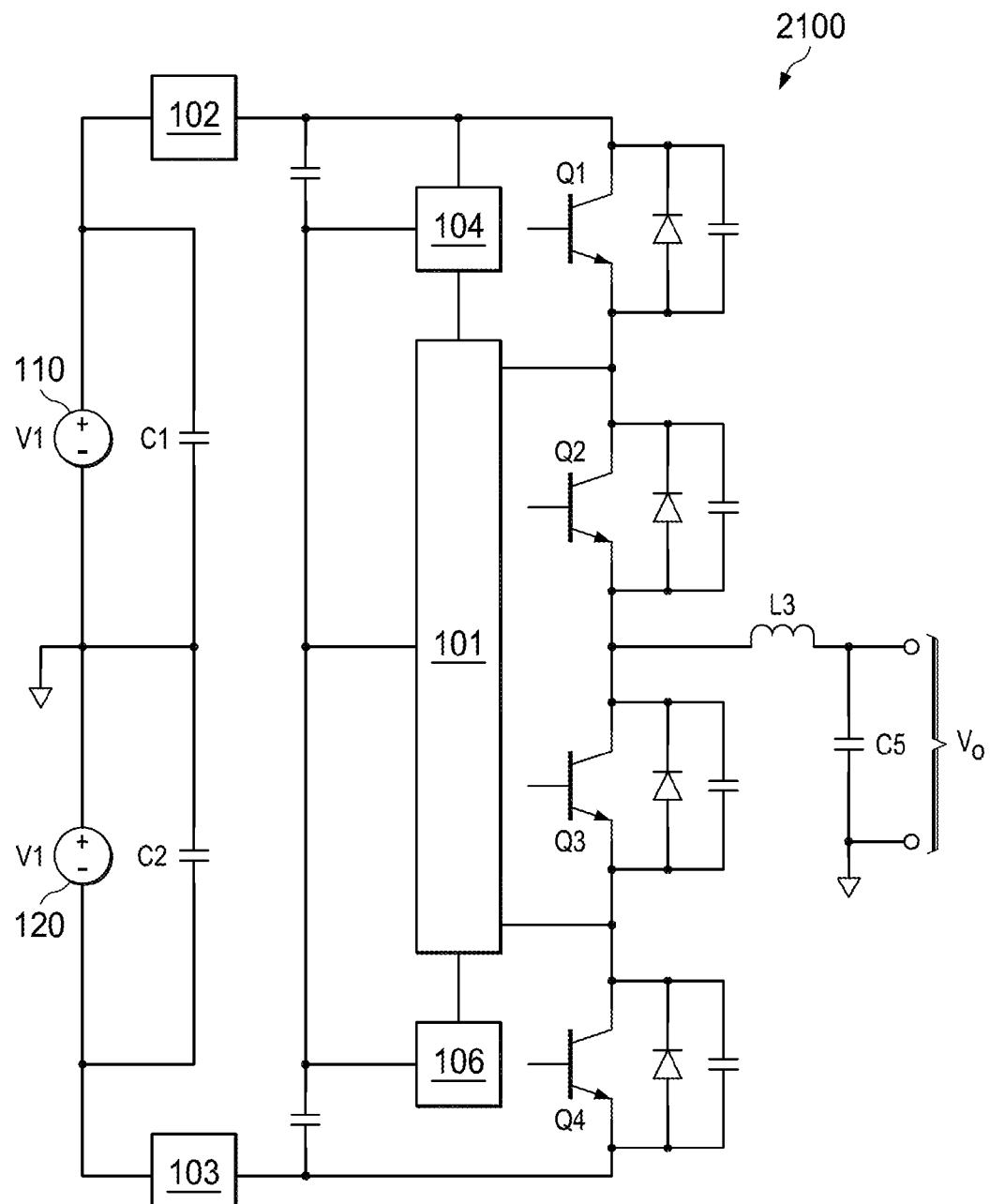
FIG. 21 illustrates a block diagram of yet another illustrative embodiment of the soft switching inverter system shown in FIG. 1 in accordance with various embodiments of the present disclosure.

FIG. 21 illustrates a block diagram of yet another illustrative embodiment of the soft switching inverter system shown in FIG. 1 in accordance with various embodiments of the present disclosure. The soft switching inverter system 2100 is similar to the soft switching inverter system 200 shown in FIG. 2 except that there may be two boost apparatuses connected in series with the first input dc source 110 and the second input dc source 120 respectively. In addition, the inverter stage of the soft switching inverter system 2100 includes switches Q1, Q2, Q3, Q4, the freewheeling apparatus 101, and the soft switching networks 104 and 106. The structure of the inverter stage is similar to that shown in FIG. 11, and hence is not discussed in detail herein to avoid repetition.

Figure 22:
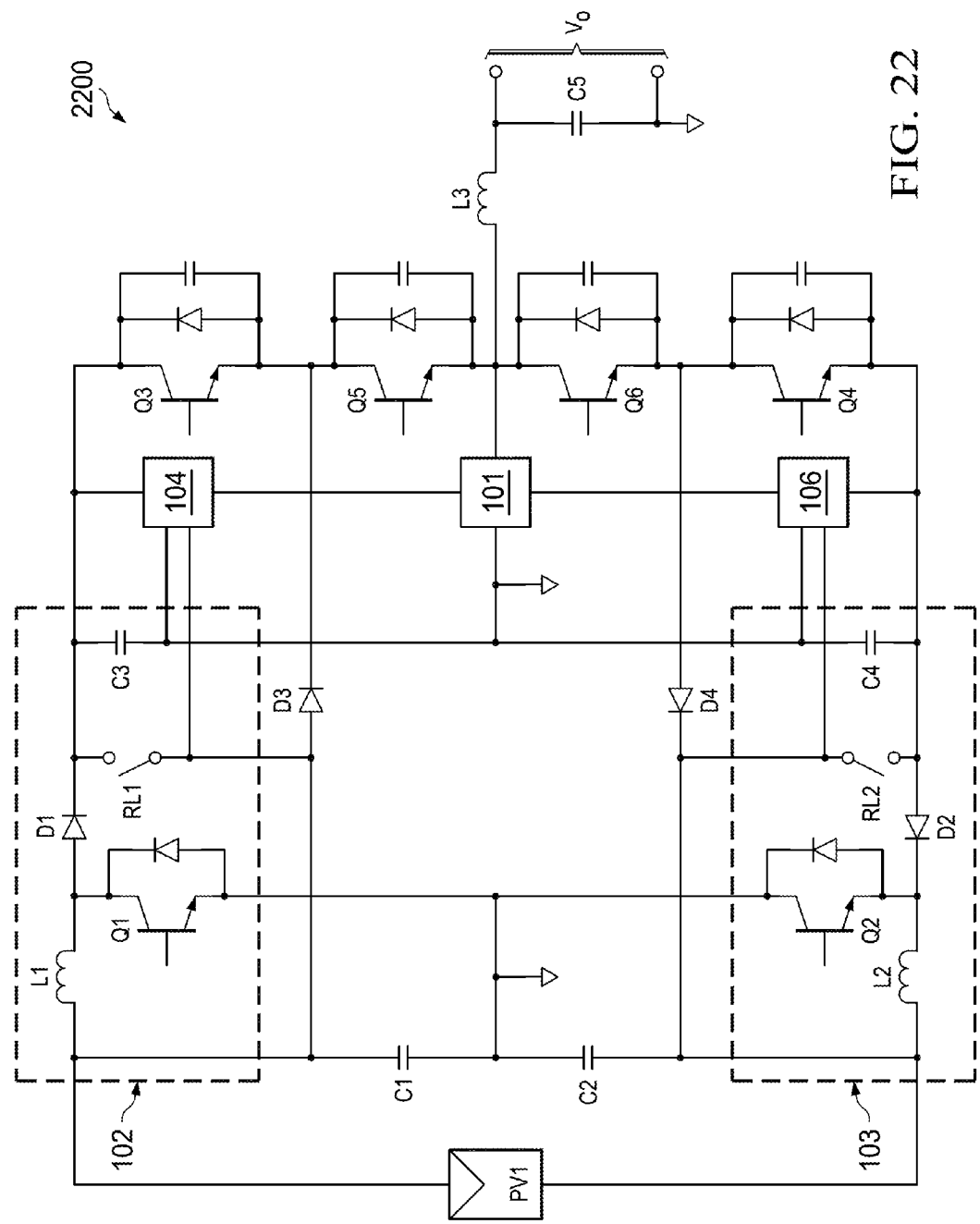
FIG. 22 illustrates a schematic diagram of the soft switching inverter system shown in FIG. 21 in accordance with various embodiments of the present disclosure.

FIG. 22 illustrates a schematic diagram of the soft switching inverter system shown in FIG. 21 in accordance with various embodiments of the present disclosure. The structures of the boost apparatuses 102 and 103 have been described above with respect to FIGS. 14-15, and hence are not discussed herein again.

Figure 23:
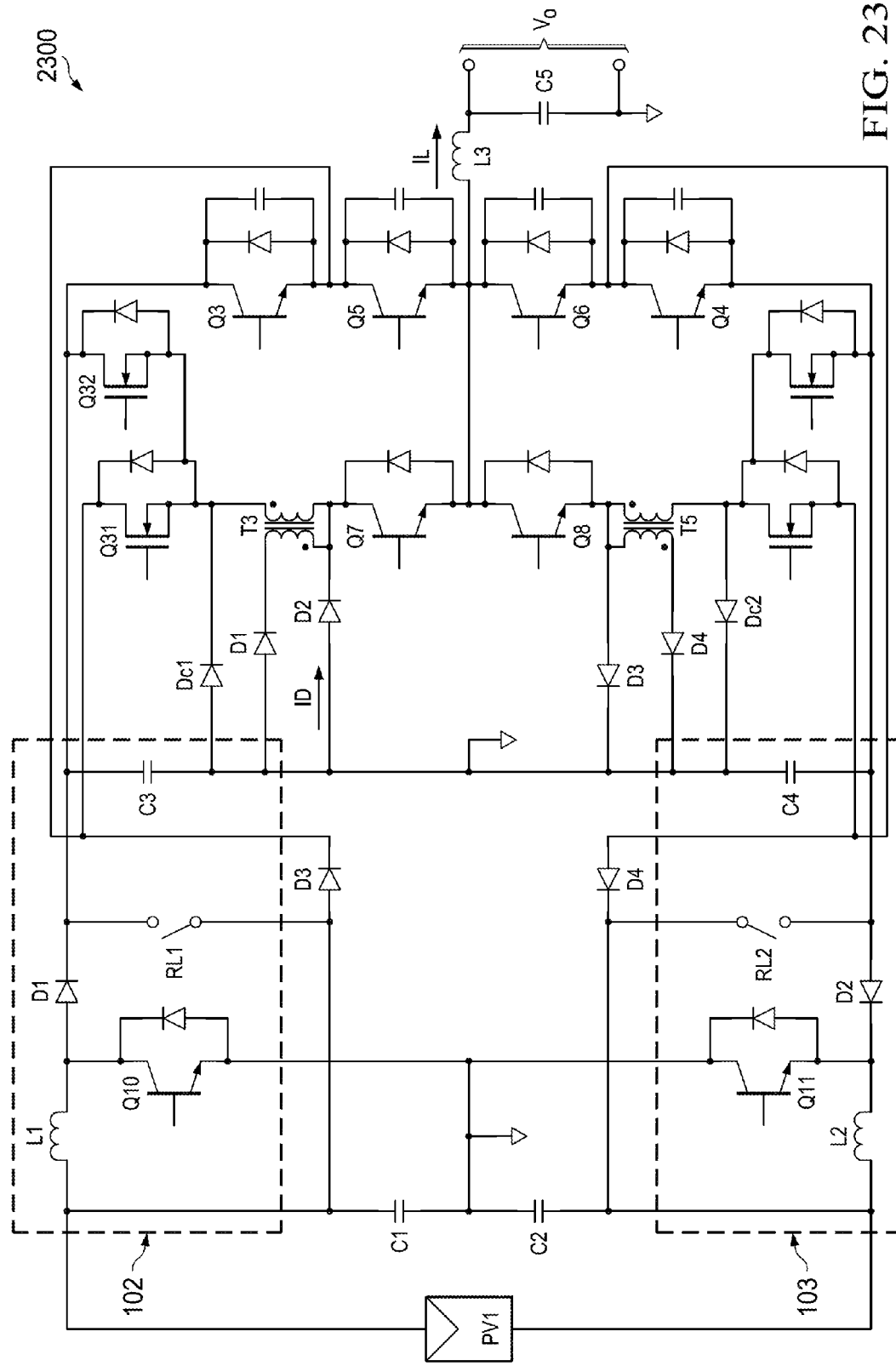
FIG. 23 illustrates a schematic diagram of a first illustrative embodiment of the soft switching inverter system shown in FIG. 21 in accordance with various embodiments of the present disclosure.

FIG. 23 illustrates a schematic diagram of a first illustrative embodiment of the soft switching inverter system shown in FIG. 21 in accordance with various embodiments of the present disclosure. The soft switching network 104 and the soft switching network 106 shown in FIG. 23 are similar to those shown in FIG. 18. In other words, there may be two auxiliary switches in each soft switching network. In addition, these two auxiliary switches such as Q31 and Q32 in the soft switching network are coupled to the input and the output of the boost apparatus (e.g., first boost apparatus 102) respectively. The operation principle of the soft switching network is similar to that shown in FIGS. 3-5, hence are not discussed again herein to avoid repetition.

Figure 24:
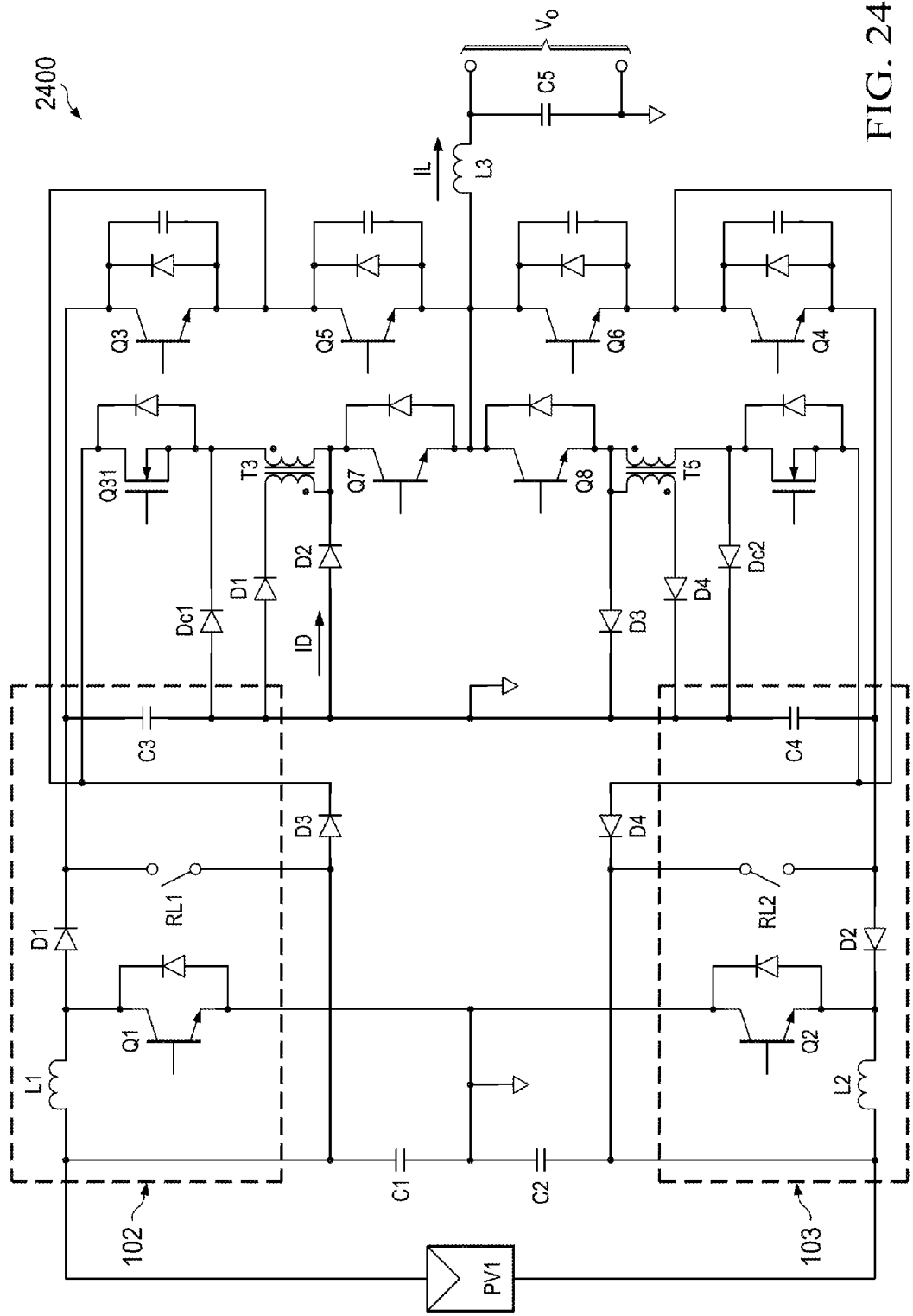
FIG. 24 illustrates a schematic diagram of a second illustrative embodiment of the soft switching inverter system shown in FIG. 21 in accordance with various embodiments of the present disclosure.

FIG. 24 illustrates a schematic diagram of a second illustrative embodiment of the soft switching inverter system shown in FIG. 21 in accordance with various embodiments of the present disclosure. The soft switching network 104 and the soft switching network 106 shown in FIG. 24 are similar to those shown in FIG. 23 except that there may be one auxiliary switch (e.g., auxiliary switch Q31) in each soft switching network.

In addition, the auxiliary switch Q31 in the soft switching network is coupled to the input of the first boost apparatus 102. The operation principle of the soft switching network is similar to that shown in FIGS. 3-5, hence are not discussed again herein to avoid unnecessary repetition.

Figure 25:
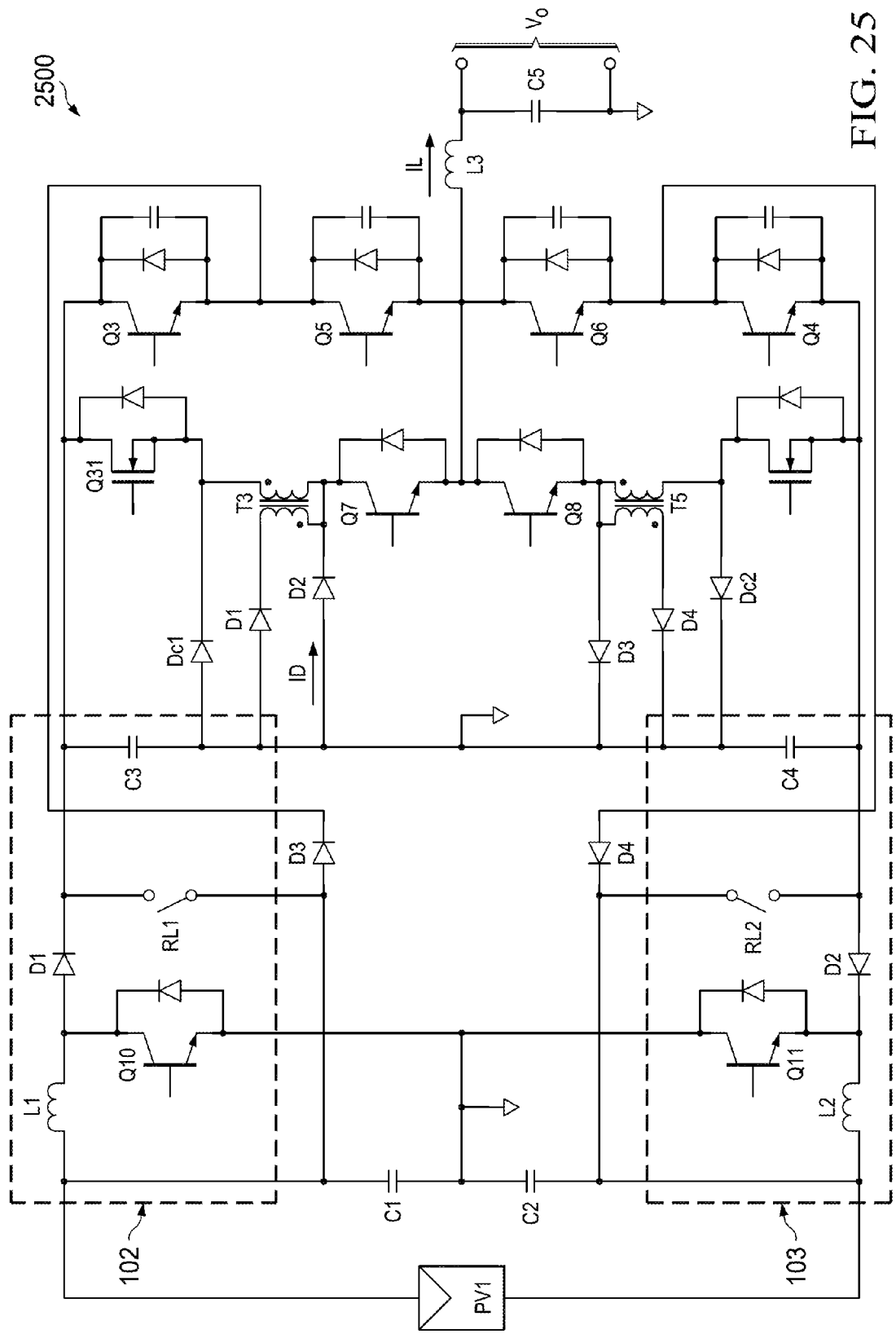
FIG. 25 illustrates a schematic diagram of a third illustrative embodiment of the soft switching inverter system shown in FIG. 21 in accordance with various embodiments of the present disclosure.

FIG. 25 illustrates a schematic diagram of a third illustrative embodiment of the soft switching inverter system shown in FIG. 21 in accordance with various embodiments of the present disclosure. The soft switching network 104 and the soft switching network 106 shown in FIG. 25 are similar to those shown in FIG. 23 except that there may be one auxiliary switch (e.g., auxiliary switch Q31) in each soft switching network.

In addition, the auxiliary switch Q31 in the soft switching network is coupled to the output of the first boost apparatus 102. The operation principle of the soft switching network is similar to that shown in FIGS. 3-5, hence are not discussed again herein to avoid unnecessary repetition.

Figure 26:
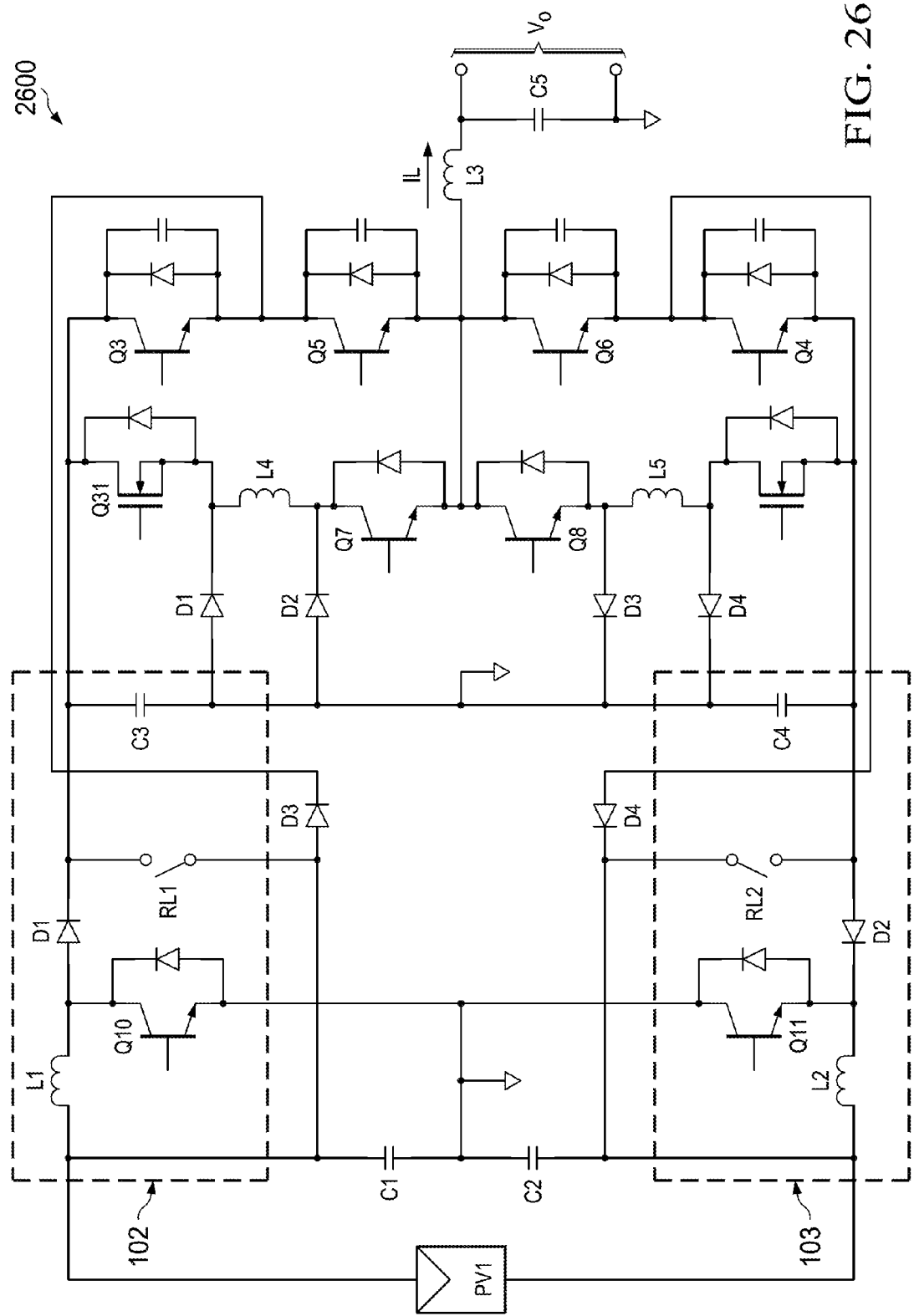
FIG. 26 illustrates a schematic diagram of a fourth illustrative embodiment of the soft switching inverter system shown in FIG. 21 in accordance with various embodiments of the present disclosure.

FIG. 26 illustrates a schematic diagram of a fourth illustrative embodiment of the soft switching inverter system shown in FIG. 21 in accordance with various embodiments of the present disclosure. The soft switching network 104 and the soft switching network 106 shown in FIG. 26 are similar to those shown in FIG. 19, hence are not discussed again herein to avoid repetition.

Figure 27:
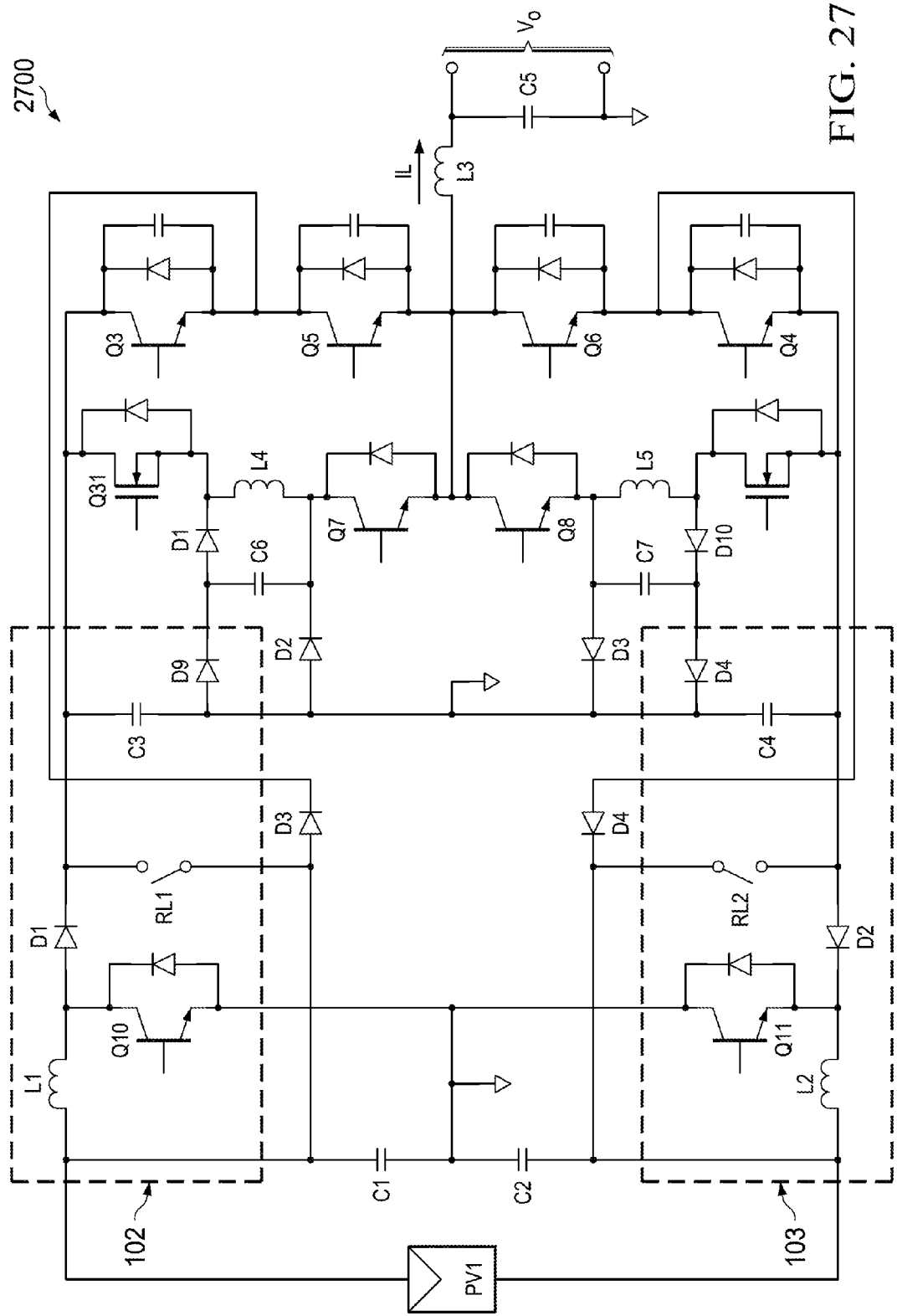
FIG. 27 illustrates a schematic diagram of a fifth illustrative embodiment of the soft switching inverter system shown in FIG. 21 in accordance with various embodiments of the present disclosure.

FIG. 27 illustrates a schematic diagram of a fifth illustrative embodiment of the soft switching inverter system shown in FIG. 21 in accordance with various embodiments of the present disclosure. The soft switching network 104 and the soft switching network 106 shown in FIG. 27 are similar to those shown in FIG. 20, hence are not discussed again herein to avoid repetition.

Figure 28:
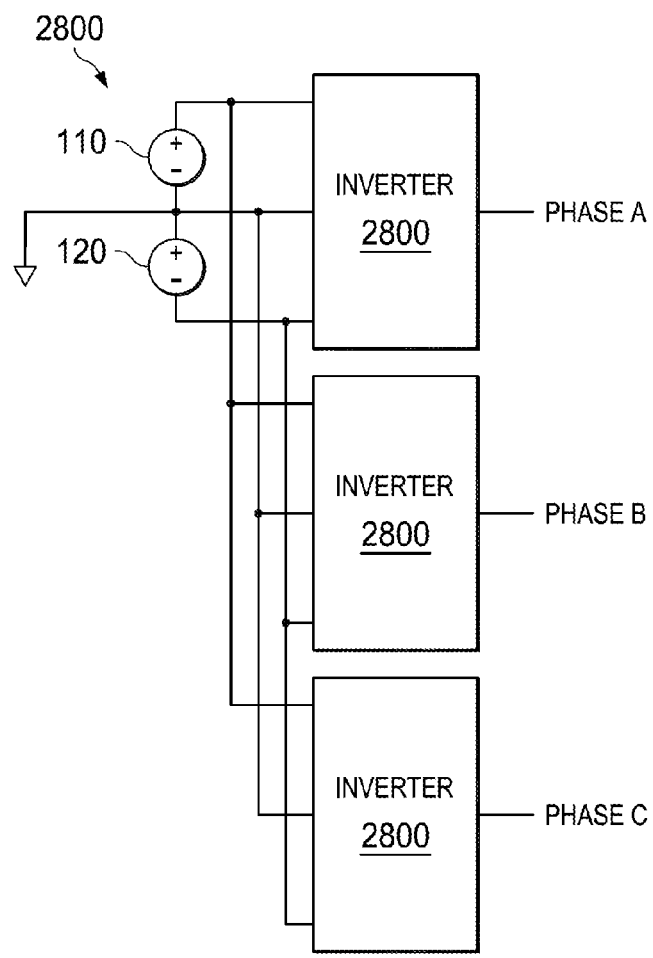
FIG. 28 illustrates a block diagram of a three-phase soft switching inverter system in accordance with various embodiments of the present disclosure.

FIG. 28 illustrates a block diagram of a three-phase soft switching inverter system in accordance with various embodiments of the present disclosure. Each phase of the three-phase multilevel inverter may employ an inverter 2800. The inverter 2800 may be of a topology of those described above with respect to FIGS. 1-27.

As shown in FIG. 18, each phase of the three-phase inverter shares a common positive dc input (e.g., the output of the first input dc source 110), a common negative dc input (e.g., the output of the second input dc source 120) and ground. Additional voltage levels may be generated by using additional boost apparatuses, which convert dc inputs into higher voltage levels. As such, the three-phase inverter shown in FIG. 28 may have an n-level (e.g., five-level) output phase voltage. In addition, the three-phase inverter may have a (2n−1)-level (e.g., nine-level) output line-to-line voltage.

Figure 29:
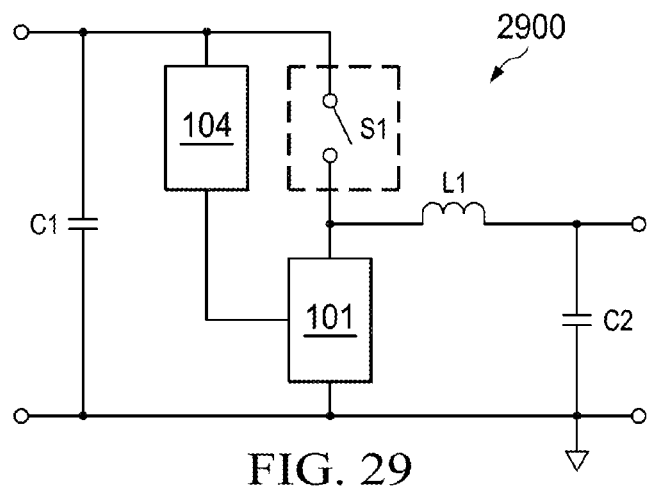
FIG. 29 illustrates a block diagram of a soft switching step-down converter in accordance with various embodiments of the present disclosure.

FIG. 29 illustrates a block diagram of a soft switching step-down converter in accordance with various embodiments of the present disclosure. The soft switching step-down converter 2900 includes a main switch S1, a freewheeling apparatus 101, an output filter and a soft switching network 104.

As shown in FIG. 29, the output filter is formed by an output inductor L1 and an output capacitor C2. The step-down converter further comprises an input capacitor C1. It should be noted that the power converter shown in FIG. 29 is common known as a buck switching regulator.

In accordance with an embodiment, the main switch (e.g., switch Q1) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

The freewheeling apparatus 101 may be implemented as a diode. Alternatively, the freewheeling apparatus 101 may be implemented as any suitable switching elements such as IGBT, MOSFTE, IGCT, GTO, SCR, JFET, MCT, any combinations thereof and/or the like. In addition, the freewheeling apparatus 101 may comprise a plurality of switching elements connected in parallel.

Figure 30:
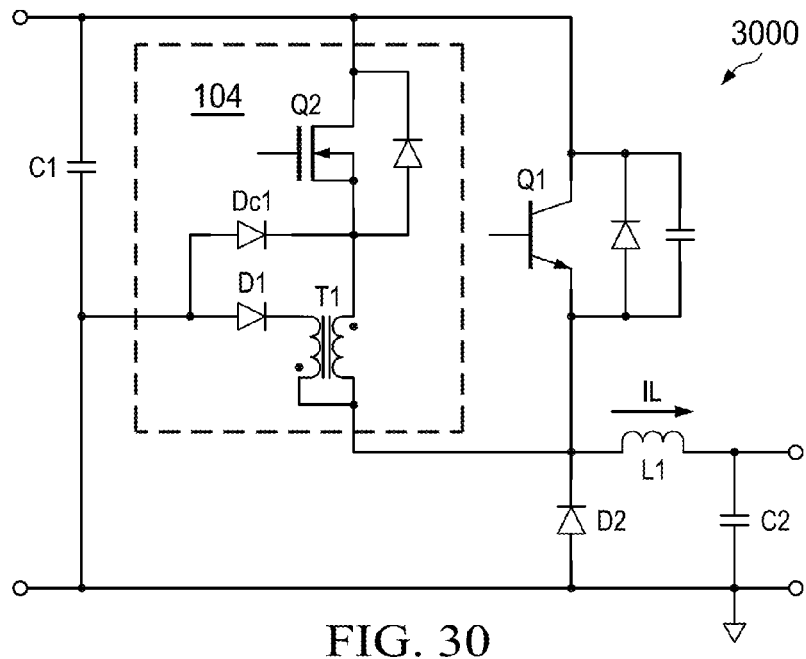
FIG. 30 illustrates a schematic diagram of a first illustrative embodiment of the soft switching step-down converter shown in FIG. 29 in accordance with various embodiments of the present disclosure.

FIG. 30 illustrates a schematic diagram of a first illustrative embodiment of the soft switching step-down converter shown in FIG. 29 in accordance with various embodiments of the present disclosure. The soft switching network 104 of the soft switching step-down converter 3000 shown in FIG. 30 is similar to that shown in FIG. 3. The operation principle of the soft switching network 104 has been described in detail above with respect to FIGS. 3-5, and hence is not discussed again herein to avoid repetition.

Figure 31:
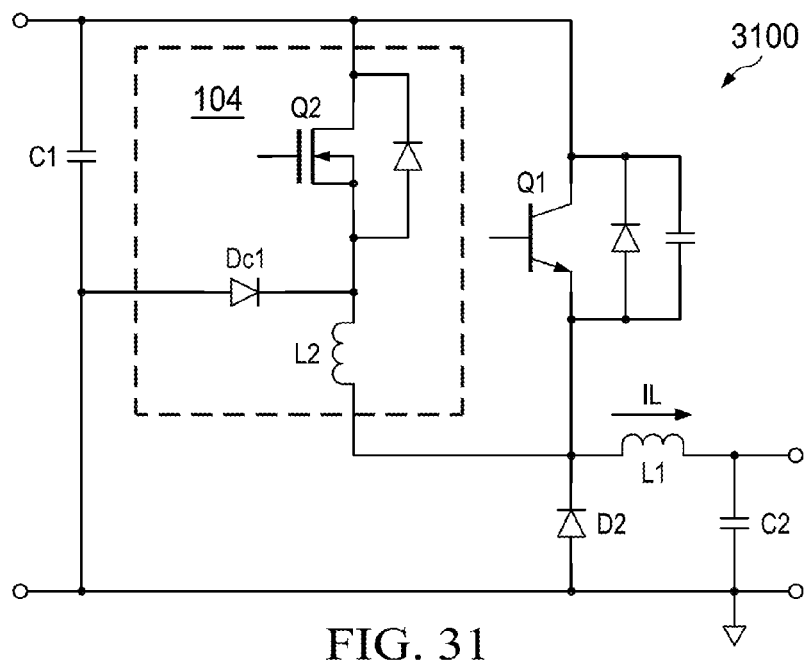
FIG. 31 illustrates a schematic diagram of a second illustrative embodiment of the soft switching step-down converter shown in FIG. 29 in accordance with various embodiments of the present disclosure.

FIG. 31 illustrates a schematic diagram of a second illustrative embodiment of the soft switching step-down converter shown in FIG. 29 in accordance with various embodiments of the present disclosure. The soft switching network 104 the soft switching step-down converter 3100 shown in FIG. 31 is similar to that shown in FIG. 6. The operation principle of the soft switching network 104 has been described in detail above with respect to FIGS. 6-7, and hence is not discussed again herein to avoid repetition.

Figure 32:
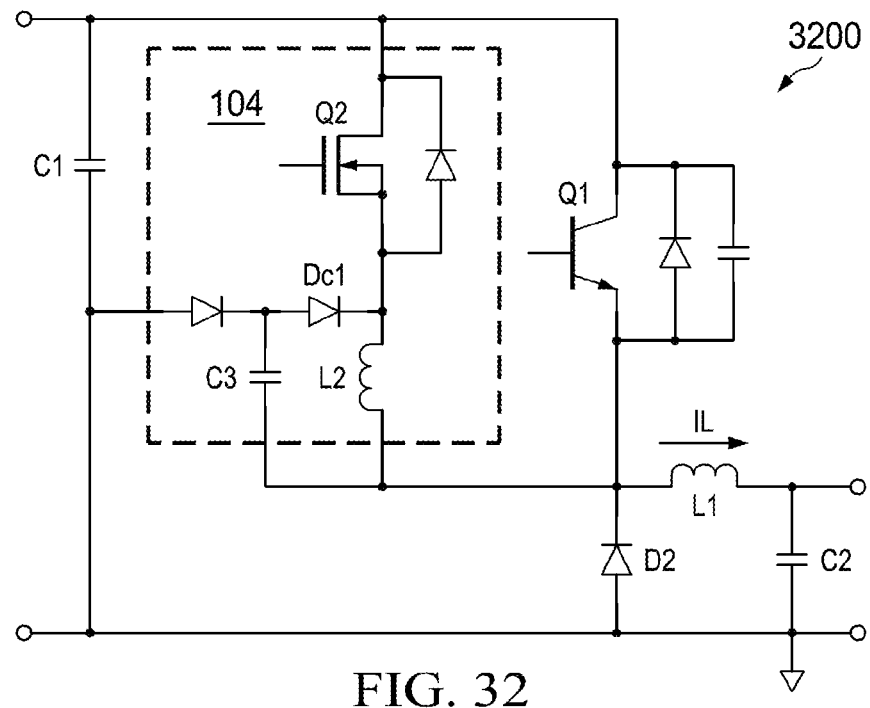
FIG. 32 illustrates a schematic diagram of a third illustrative embodiment of the soft switching step-down converter shown in FIG. 29 in accordance with various embodiments of the present disclosure.

FIG. 32 illustrates a schematic diagram of a third illustrative embodiment of the soft switching step-down converter shown in FIG. 29 in accordance with various embodiments of the present disclosure. The soft switching network 104 of the soft switching step-down converter 3200 shown in FIG. 32 is similar to that shown in FIG. 8. The operation principle of the soft switching network 104 has been described in detail above with respect to FIGS. 8-10, and hence is not discussed again herein to avoid repetition.

Figure 33:
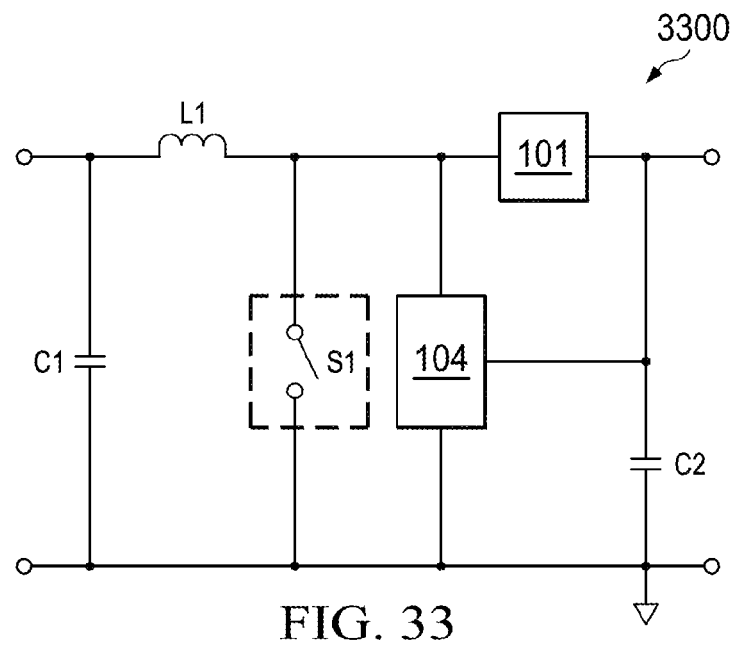
FIG. 33 illustrates a block diagram of a soft switching step-up converter (a buck converter) in accordance with various embodiments of the present disclosure.

FIG. 33 illustrates a block diagram of a soft switching step-up converter in accordance with various embodiments of the present disclosure. As shown in FIG. 33, the soft switching step-up converter 3300 includes an input capacitor C1, an input inductor L1, a main switch S1, a freewheeling apparatus 101, an output capacitor C2 and a soft switching network 104.

In accordance with an embodiment, the main switch (e.g., switch Q1) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

The freewheeling apparatus 101 may be implemented as a diode. Alternatively, the freewheeling apparatus 101 may be implemented as a switching element such as IGBT, MOSFTE, IGCT, GTO, SCR, JFET, MCT, any combinations thereof and/or the like. It should be noted that both the main switch S1 and the freewheeling apparatus 101 may comprise a plurality of switching elements connected in parallel.

Figure 34:
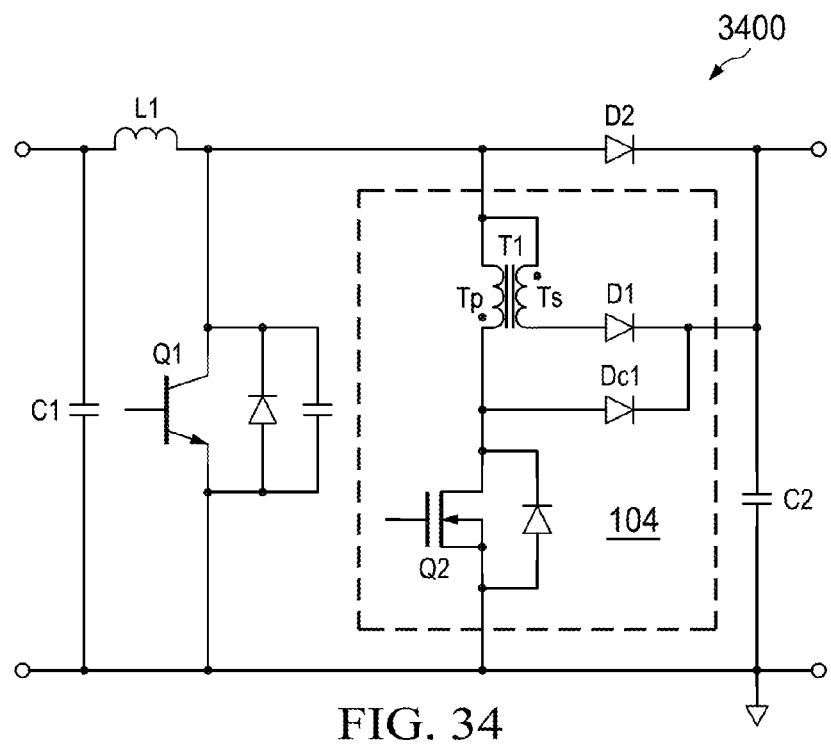
FIG. 34 illustrates a schematic diagram of a first illustrative embodiment of the soft switching step-up converter shown in FIG. 33 in accordance with various embodiments of the present disclosure.

FIG. 34 illustrates a schematic diagram of a first illustrative embodiment of the soft switching step-up converter shown in FIG. 33 in accordance with various embodiments of the present disclosure. The soft switching network 104 of the soft switching step-up converter 3400 shown in FIG. 34 is similar to that shown in FIG. 3. The structure of the soft switching network 104 has been described in detail above with respect to FIG. 3, and hence is not discussed again herein to avoid repetition. The operation principle of the soft switching network 104 will be described below in detail with respect to FIG. 35.

Figure 35:
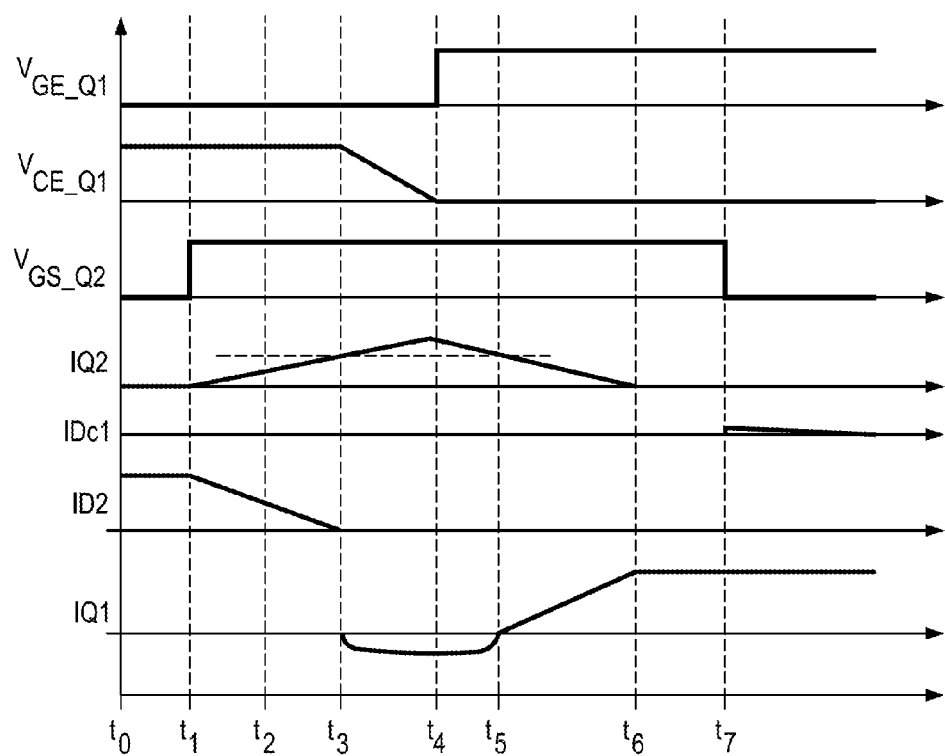
FIG. 35 illustrates a timing diagram of various signals in the soft switching step-up converter (a boost converter) in FIG. 34 in accordance with various embodiments of the present disclosure.

FIG. 35 illustrates a timing diagram of various signals in the soft switching step-up converter in FIG. 34 in accordance with various embodiments of the present disclosure. The timing diagram of FIG. 35 is similar to that shown in FIG. 6, and hence is not discussed in further detail herein.

It should be noted that the diode Dc1 may function as a clamping element (e.g., the clamping current at the time instant t7). Therefore, the current stress on the diode Dc1 is relatively small. In addition, referring back to FIG. 34, the soft switching network 104 may help to achieve a zero voltage transition of the main switch Q1. The auxiliary switch Q2 may achieve zero current switching. Likewise, the diode D2 may achieve a zero current transition.

It should further be noted that during a turn-on transition of the main switch Q1, Q3 is turned on prior to the turn-on of the main switch Q1. The turned-on Q3 helps to shift the load current into the transformer T1. In particular, the primary side Tp and the secondary side Ts of the transformer T1 may share the load current. As such, when the primary side turns are equal to the secondary side turns, the current stress on the auxiliary switch Q2 and the diode D2 is about one half of the load current.

Figure 36:
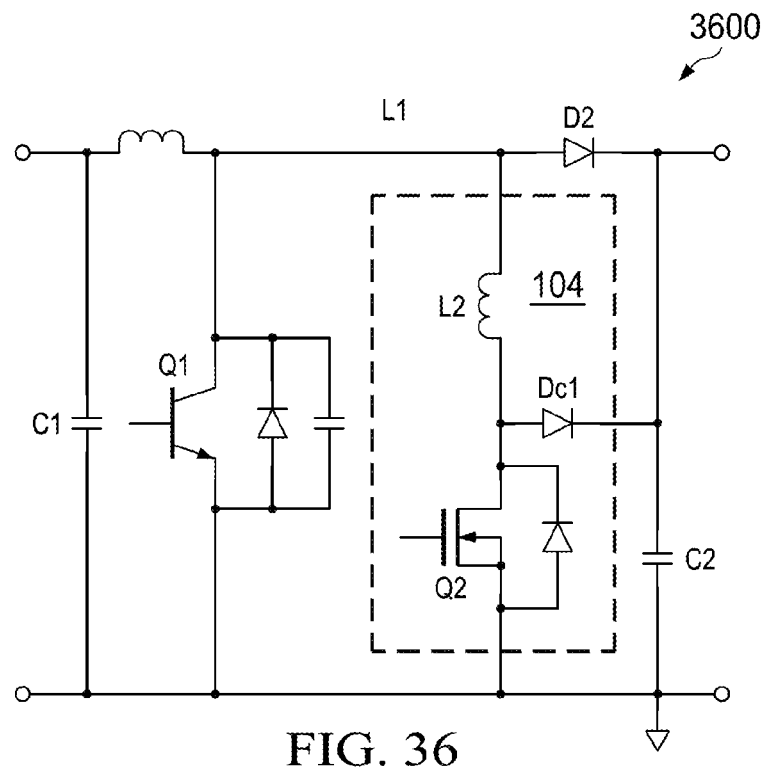
FIG. 36 illustrates a schematic diagram of a second illustrative embodiment of the soft switching step-up converter shown in FIG. 33 in accordance with various embodiments of the present disclosure.

FIG. 36 illustrates a schematic diagram of a second illustrative embodiment of the soft switching step-up converter shown in FIG. 33 in accordance with various embodiments of the present disclosure. The soft switching network 104 of the soft switching step-up converter 3600 shown in FIG. 36 is similar to that shown in FIG. 6, and hence is not discussed again herein to avoid repetition.

Figure 37:
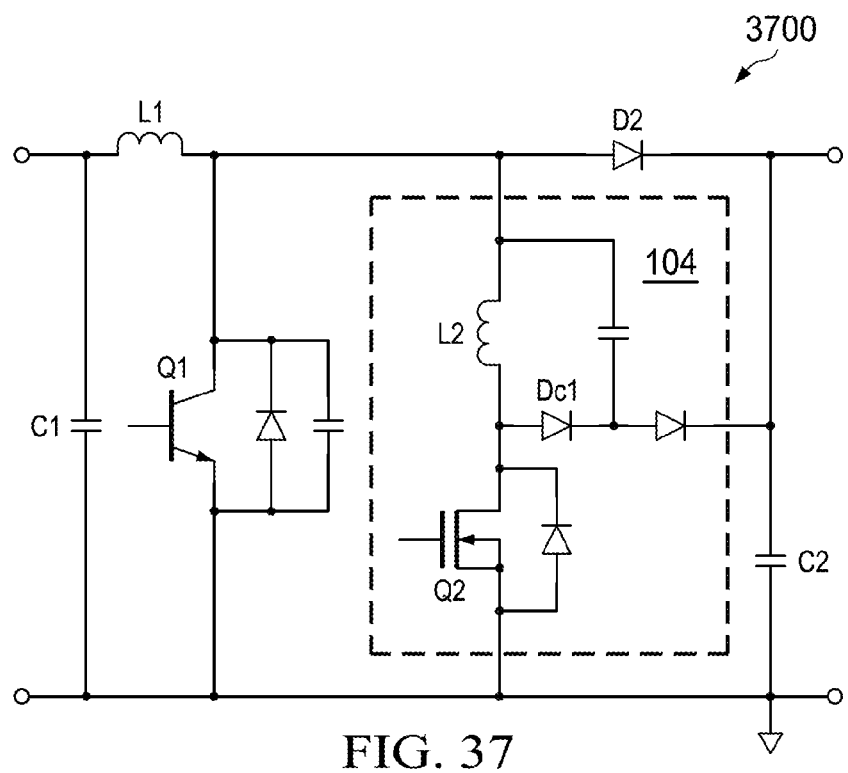
FIG. 37 illustrates a schematic diagram of a third illustrative embodiment of the soft switching step-up converter shown in FIG. 33 in accordance with various embodiments of the present disclosure.

FIG. 37 illustrates a schematic diagram of a third illustrative embodiment of the soft switching step-up converter shown in FIG. 33 in accordance with various embodiments of the present disclosure. The soft switching network 104 of the soft switching step-up converter 3700 shown in FIG. 37 is similar to that shown in FIG. 8, and hence is not discussed again herein to avoid repetition.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a soft switching network coupled to a power converter comprising a main switch, a freewheeling apparatus and an output filter formed by an inductor and a capacitor, wherein the freewheeling apparatus is connected between an input of the output filter and a common node of two input capacitors, and wherein the soft switching network comprises:
a magnetic device, an auxiliary switch and a plurality of diodes, and wherein the soft switching network is configured such that:
the main switch is of zero voltage switching; and
the auxiliary switch is of zero current switching, wherein the auxiliary switch is configured to be turned on prior to a zero voltage transition of the main switch and be turned off after the zero voltage transition.

2. The apparatus of claim 1, wherein:
the power converter is selected from the group consisting of an inverter, a multilevel inverter, a step-down converter, a step-up converter and any combinations thereof.

3. The apparatus of claim 1, wherein:
the main switch is selected from the group consisting of an insulated gate bipolar transistor (IGBT) device, a metal oxide semiconductor field-effect transistor (MOSFET) device, an integrated gate commutated thyristor (IGCT) device, a gate turn-off thyristor (GTO) device, a silicon controlled rectifier (SCR) device, a junction gate field-effect transistor (JFET) device, a MOS controlled thyristor (MCT) device and any combinations thereof.

4. The apparatus of claim 1, wherein the soft switching network comprises:
a transformer having:
a first terminal coupled to the main switch through the auxiliary switch;
a second terminal coupled to an input of the output filter;
a third terminal connected with the second terminal; and
a fourth terminal, wherein the fourth terminal and the second terminal share a same polarity;
a first diode coupled between the first terminal and an input terminal of the power converter;
a second diode coupled between the fourth terminal and the input terminal of the power converter; and
a third diode coupled between the third terminal and the input terminal of the power converter.

5. The apparatus of claim 1, wherein:
the soft switching network comprises:
an inductor having a first terminal coupled to the main switch through the auxiliary switch;
a first diode coupled between the first terminal of the inductor and an input terminal of the power converter; and
a second diode coupled between a second terminal of the inductor and the input terminal of the power converter.

6. The apparatus of claim 1, wherein:
the soft switching network comprises:
an inductor having a first terminal coupled to the main switch through the auxiliary switch;
a first diode and a second diode connected in series and further coupled between the first terminal of the inductor and an input terminal of the power converter; and
a third diode coupled between a second terminal of the inductor and the input terminal of the power converter; and
an auxiliary capacitor coupled between the second terminal of the inductor and a common node of the first diode and the second diode.

7. A method comprising:
providing a soft switching network coupled to a main switch, a freewheeling apparatus and an output filter of a power converter, wherein the freewheeling apparatus is connected between an input of the output filter and a common node of two input capacitors, and wherein the soft switching network comprises:
a magnetic device;
an auxiliary switch connected in series with the magnetic device; and
a plurality of diodes coupled to the magnetic device;
prior to a zero voltage transition of the main switch, turning on the auxiliary switch; and after the zero voltage transition, turning off the auxiliary switch.

8. The method of claim 7, further comprising:
coupling a plurality of input capacitors to a dc input power source, wherein the plurality of input capacitors are connected in series and a common node of the plurality of input capacitors is connected to ground;
coupling a first main switch between the output filter and a first output terminal of the dc input power source;

coupling a second main switch between the output filter and a second output terminal of the dc input power source;

coupling the freewheeling apparatus between the output filter and ground;

coupling a first soft switching network to the first main switch; and coupling a second soft switching network to the second main switch.

9. The method of claim 7, wherein:

the auxiliary switch is of a zero current transition during a turn-off process of the auxiliary switch.

10. The method of claim 7, wherein:

the magnetic device is a transformer, and wherein:

the transformer having a first terminal coupled to the main switch through the auxiliary switch, a second terminal coupled to an input of the output filter, a third terminal connected with the second terminal and a fourth terminal, wherein the fourth terminal and the second terminal share a same polarity;

a first diode coupled between the first terminal and an input terminal of the power converter;

a second diode coupled between the fourth terminal and the input terminal of the power converter; and a third diode coupled between the third terminal and the input terminal of the power converter.

* * * * *